(12) United States Patent
Hosokane

(10) Patent No.: US 9,911,072 B2
(45) Date of Patent: Mar. 6, 2018

(54) TWO-DIMENSIONAL CODE, AND TWO-DIMENSIONAL-CODE ANALYSIS SYSTEM

(71) Applicant: KYODO PRINTING CO., LTD., Tokyo (JP)

(72) Inventor: Yutaka Hosokane, Tokyo (JP)

(73) Assignee: KYODO PRINTING CO., LTD., Tokyo (JP)

( * ) Notice: Subject to any disclaimer, the term of this patent is extended or adjusted under 35 U.S.C. 154(b) by 0 days.

(21) Appl. No.: 15/336,345

(22) Filed: Oct. 27, 2016

(65) Prior Publication Data

US 2017/0046606 A1 Feb. 16, 2017

Related U.S. Application Data

(63) Continuation of application No. PCT/JP2015/061475, filed on Apr. 14, 2015.

(30) Foreign Application Priority Data

May 14, 2014 (JP) .................................. 2014-100985

(51) Int. Cl.
*G06K 19/06* (2006.01)

(52) U.S. Cl.
CPC ....... *G06K 19/06037* (2013.01); *G06K 19/06* (2013.01); *G06K 19/06075* (2013.01); *G06K 19/06131* (2013.01)

(58) Field of Classification Search
CPC ... G06K 19/06037; G06K 7/14; G06K 7/1417
USPC ................. 235/462.09, 462.1, 494
See application file for complete search history.

(56) References Cited

U.S. PATENT DOCUMENTS

| | | | |
|---|---|---|---|
| 5,591,956 A | 1/1997 | Longacre, Jr. et al. | |
| 5,726,435 A | 3/1998 | Hara et al. | |
| 6,267,296 B1 * | 7/2001 | Ooshima | G06K 19/06037 235/462.08 |

(Continued)

FOREIGN PATENT DOCUMENTS

| | | |
|---|---|---|
| CN | 101667256 A | 3/2010 |
| CN | 102034127 A | 4/2011 |

(Continued)

OTHER PUBLICATIONS

International Search Report issued corresponding International Application No. PCT/JP2015/061475 dated Jun. 2, 2015.

(Continued)

*Primary Examiner* — Ahshik Kim
(74) *Attorney, Agent, or Firm* — Myers Wolin, LLC

(57) ABSTRACT

In this rectangular two-dimensional code, data expressed in binary code is divided into cells, and arranged as a two-dimensional matrix-like pattern. The two-dimensional code is characterized by being provided with a rectangular basic pattern section. The two-dimensional code is further characterized in that: the basic pattern section includes a plurality of position detection patterns for specifying cell positions, and version information indicating the size of the two-dimensional code; and the version information is used to enable the size of the two-dimensional code to be variably designed while the distances between the plurality of position detection patterns are in a fixed state.

18 Claims, 22 Drawing Sheets

(56) References Cited

U.S. PATENT DOCUMENTS

| | | | |
|---|---|---|---|
| 2002/0028015 A1 | 3/2002 | Tack-Don et al. | |
| 2007/0187512 A1 | 8/2007 | Yada | |
| 2008/0112609 A1 | 5/2008 | Inoue | |
| 2009/0121024 A1 | 5/2009 | Umeda | |
| 2009/0242649 A1 | 10/2009 | Mizukoshi et al. | |
| 2012/0273563 A1* | 11/2012 | Shimamoto | G06K 7/1456 235/375 |
| 2014/0361083 A1* | 12/2014 | Shao | G06K 7/1443 235/462.1 |

FOREIGN PATENT DOCUMENTS

| | | |
|---|---|---|
| JP | H107-254037 A | 10/1995 |
| JP | 10-214317 A | 8/1998 |
| JP | 2007-213359 A | 8/2007 |
| JP | 2009-110070 A | 5/2009 |
| JP | 2010-61281 A | 3/2010 |
| TW | 541502 B | 7/2003 |
| TW | 200821761 A | 5/2008 |

OTHER PUBLICATIONS

Japanese Standards Association, "Two dimensional symbol—QR—Code-Basic specification", JIS X 0510:2004, Japanese Industrial Standards Committee, Revised Nov. 20, 2004. English front page attached.

Office Action issued by the State Intellectual Property Office of China for corresponding Chinese Patent Application No. 201580025134.1, dated Jun. 1, 2017.

Partial supplementary European search report issued by the European Patent Office for corresponding European Patent Application No. 15792110.7, dated Jan. 11, 2018.

"ISO/IEC 18004:2000 Information technology—Automatic identification and data capture techniques—Bar code symbology—QR Code", Jun. 15, 2000. XP055051714, Geneva. Retrieved from the Internet: URL: http://raidenii.net/files/datasheets/misc/qr_code.pdf [retrieved on Jan. 30, 2013] pp. 6-12.

* cited by examiner

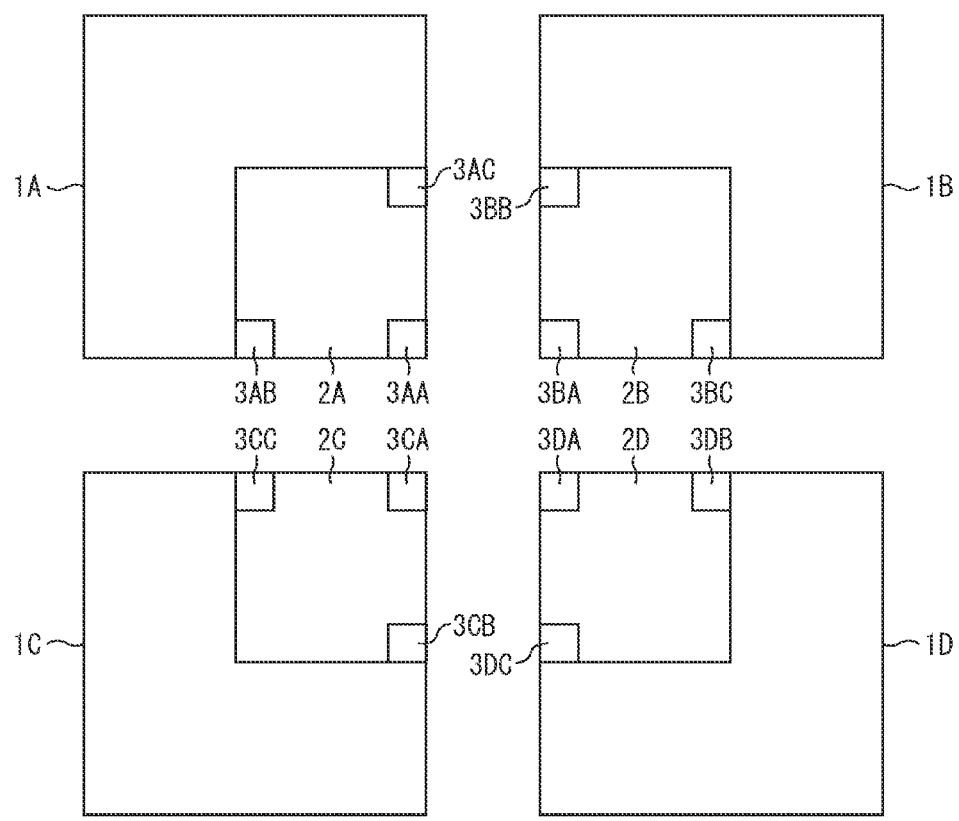

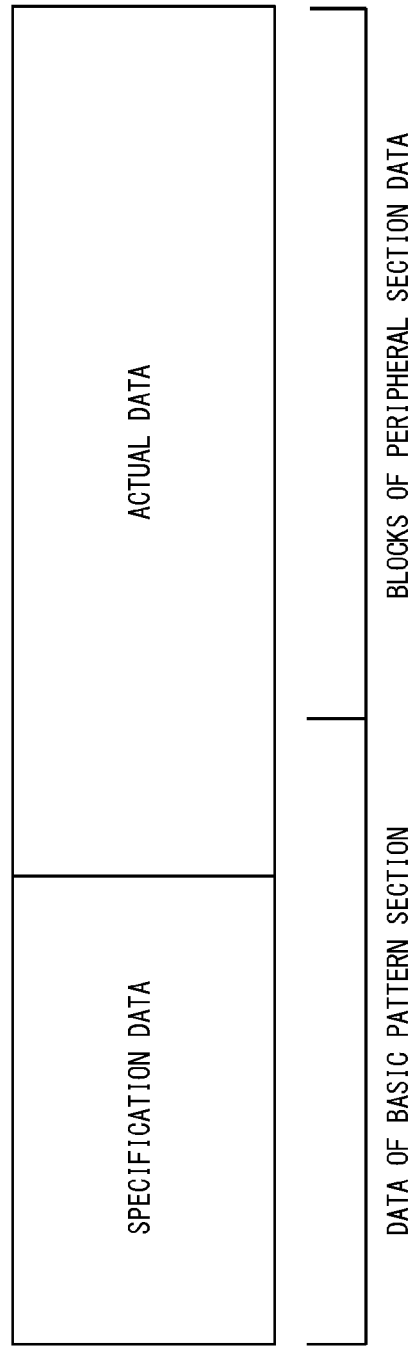

FIG. 10B

| SEGMENT | | SEGMENT | | SEGMENT | |
|---|---|---|---|---|---|
| MESSAGE HEADER (END FLAG:FALSE · MESSAGE LENGTH · MESSAGE ENCODE METHOD) | MESSAGE | MESSAGE HEADER (END FLAG:FALSE · MESSAGE LENGTH · MESSAGE ENCODE METHOD) | MESSAGE | MESSAGE HEADER (END FLAG:TRUE) | PADDING |

ACTUAL DATA

TWO-DIMENSIONAL CODE, AND TWO-DIMENSIONAL-CODE ANALYSIS SYSTEM

CROSS-REFERENCE TO RELATED APPLICATIONS

This application is a continuation of International Application PCT/JP2015/061475, filed on Apr. 14, 2015, which claims foreign priority to Japanese Patent Application No. 2014-100985, filed on May 14, 2014, the entire contents of each are hereby incorporated by reference.

TECHNICAL FIELD

The present invention relates to a two-dimensional code and a two-dimensional code analysis system.

BACKGROUND ART

As compared to one-dimensional codes, two-dimensional codes are capable of storing more information in a smaller area and are thus widely utilized in a variety of applications, such as inventory management and Web derivatives using mobile phones. Among two-dimensional codes, those whose size can be modified in accordance with the amount of data to be maintained therein are known. In the analysis of such a two-dimensional code, the size, direction and the like of the code are often unclear beforehand; therefore, this information are determined from a photographed image of the two-dimensional code.

A two-dimensional code comprises position detection patterns of a prescribed form for detecting the positional relationship of its photographed image. In such a two-dimensional code, the position detection patterns have a form that can be independently and easily distinguished from other parts. When a two-dimensional code is analyzed, on its photographed image, the position detection patterns are detected and conversion is performed based on their positional relationships. Detection of the position detection patterns is a fundamental process of the analysis and largely affects the recognition accuracy and the analysis time. Thus, the form of each position detection pattern is a critical element for two-dimensional codes.

As conventional two-dimensional codes, mainly the codes disclosed in Patent Literatures 1 and 2 are known.

Further, in two-dimensional codes, there is a need to recognize plural codes at the same time. As for the simultaneous recognition of plural codes, for example, when cardboard boxes each having a two-dimensional code pasted thereon are stored facing the same direction on a shelf and an inventory thereof is to be made, the work efficiency is improved if the two-dimensional codes could all be recognized at once from a distance, rather than recognizing the codes one by one at a short distance from each box. It is known that such simultaneous recognition can be done using an RFID or the like; however, RFIDs require an antenna or the like on the medium side, which leads to an increased medium cost. In contrast, two-dimensional codes are inexpensive because they can be used by simply printing them on a sheet of paper.

CITATIONS LIST

Patent Literatures

[Patent Literature 1] Japanese Unexamined Patent Publication (Kokai) No. H7-254,037
[Patent Literature 2] U.S. Pat. No. 5,591,956

Non-Patent Literature

[Non-patent Literature 1] JIS X 0510:2004

SUMMARY OF INVENTION

Technical Problem

In the two-dimensional code of Patent Literature 2 which has only one position detection pattern (Aztec code), if the single position detection pattern could not be detected due to contamination or image blurriness, the analysis of the two-dimensional code would be defective. In simultaneous recognition of plural codes, when all of the codes could not be recognized, the codes are photographed repeatedly until all of them are recognized in many cases, and low recognition accuracy leads to an increase in the number of photographs to be taken, which reduces the merit of simultaneously reading plural codes. Accordingly, in the recognition of plural two-dimensional codes, the code reading reliability is desired to be higher than when a single two-dimensional code is read and, therefore, two-dimensional codes having only one position detection pattern are not suitable for simultaneous recognition of plural codes in the first place.

As a countermeasure, a method of imparting a code with redundancy by adding another position detection pattern may be employed; however, in this case, there arises the same problem as in the below-described code having plural position detection patterns.

In the two-dimensional code of Patent Literature 1 which has plural position detection patterns, the recognition reliability is easily improved since contamination of one of the position detection patterns can be complemented with other position detection patterns.

In recognition of a plurality of the two-dimensional codes of Patent Literature 1, since plural position detection patterns are captured in a single image, there will be plural combinations of the position detection patterns having the same form. In this case, combinations of the position detection patterns contained in the same two-dimensional code need to be searched. There are mainly two technical problems that make it difficult to simultaneously recognize a plural of two-dimensional codes each having plural position detection patterns.

The first problem relates to the distance between the position detection patterns. When the size of the two-dimensional code of Patent Literature 1 is modified in accordance with its data capacity, since the position detection patterns are always arranged at corners, the distances between the position detection patterns are variable depending on the size of the code. This is also described in Literature 3 which cites the Patent Literature 1. Generally, it is required to modify the size of a two-dimensional code in accordance with the data capacity of the code. Thus, when searching for a combination of position detection patterns belonging to the same two-dimensional code, all of the combinations of position detection patterns having long and short distances therebetween must be detected and, when a large number of two-dimensional codes are captured in a single image, the amount of the calculation to be made is huge.

The second problem relates to the external shape (profile) of the position detection patterns. When plural position detection patterns having the same external shape are arranged at close distance from each other and in the same direction, it is difficult to figure out a combination of position detection patterns contained in the same two-dimensional code, and it is thus required to examine which of many combinations of position detection patterns can yield the correct code content.

As described above, in the recognition of plural codes, the use of two-dimensional codes having plural position detection patterns improves the two-dimensional code-reading reliability and enhances the efficiency-improving effect attained by simultaneous recognition of plural codes; however, as a disadvantage, there is a problem that the analysis is difficult and, if the analysis is possible, the analysis requires a long time.

An object of the present invention is to realize: a two-dimensional code comprising plural position detection patterns and a two-dimensional code analysis system, wherein, by making it easy to determine whether or not a combination of position detection patterns belongs to the same two-dimensional code even when a plurality of the two-dimensional codes are included in a single image, the analysis process is hardly affected even by an increase in the number of the two-dimensional codes to be recognized at once.

As two-dimensional codes, there have been also proposed color codes in which information is read based on the color of each cell and, in this case, it is considered allocating plural position detection patterns with the same form but different colors so as to specify the plural position detection patterns. However, the majority of code printers are monochrome printers and readily affected by the conditions of the printers and inks as well as the external environment such as lighting; therefore, there is a concern in terms of the accuracy. In the present specification, a monochrome two-dimensional code is described as an example.

Solution to Problem

The invention of claim 1 is a rectangular two-dimensional code comprising cells representing binary-coded data that are arranged as a pattern in the form of a two-dimensional matrix, wherein the two-dimensional code comprises a rectangular basic pattern section which comprises: plural position detection patterns for specifying the cell positions; and version information that indicates the size of the two-dimensional code, and the version information is used to enable to variably design the size of the two-dimensional code with the distances between the plural position detection patterns being fixed.

The invention of claim 2 is the two-dimensional code according to claim 1 or 2, where the plural position detection patterns have different external shapes from one another.

The invention of claim 3 is the two-dimensional code according to claim 1 or 2, which comprises a peripheral section formed outside the basic pattern section.

The invention of claim 4 is the two-dimensional code according to claim 3, wherein, for a combination of two of the plural position detection patterns, the distance between two points at which a straight line connecting the centers of the two position detection patterns intersects the boundary between the rectangular two-dimensional code and the outside is greater than twice the distance between the centers of the two position detection patterns.

The invention of claim 5 is a two-dimensional code analysis system analyzing an image obtained by photographing first and second two-dimensional codes at once, which first and second two-dimensional codes each comprises plural position detection patterns for specifying the cell positions, wherein the two-dimensional code analysis system comprises an exclusion means for excluding false combinations of a position detection pattern contained in the first two-dimensional code and a position detection pattern contained in the second two-dimensional code.

The invention of claim 6 is the two-dimensional code analysis system according to claim 5, wherein, when two of the position detection patterns do not have a prescribed distance therebetween, the exclusion means excludes the combination of these two position detection patterns as a false combination of position detection patterns that is not a combination of position detection patterns contained in a single two-dimensional code.

The invention of claim 7 is the two-dimensional code analysis system according to claim 5 or 6, wherein the exclusion means is a means for excluding a combination(s) of the position detection patterns based on the external shapes of the position detection patterns.

Advantageous Effects of Invention

The two-dimensional code of the present invention comprises plural position detection patterns and can be designed such that the size of the code can be modified in accordance with its data capacity. Even when a plurality of the two-dimensional codes are photographed in a single image, since whether or not a combination of position detection patterns contained in the same two-dimensional code can be easily determined, the analysis process can be reduced.

BRIEF DESCRIPTION OF DRAWINGS

FIG. 7B is a drawing (2) that illustrate a case where the center of the basic pattern section and that of a two-dimensional code do not coincide (are relatively displaced) with each other;

FIG. 10A illustrates an example of the structure of the data recorded in the two-dimensional code of the second embodiment;

FIG. 10B illustrates an example of the structure of the actual data recorded in the two-dimensional code of the second embodiment;

DESCRIPTION OF EMBODIMENTS

Figure 1:
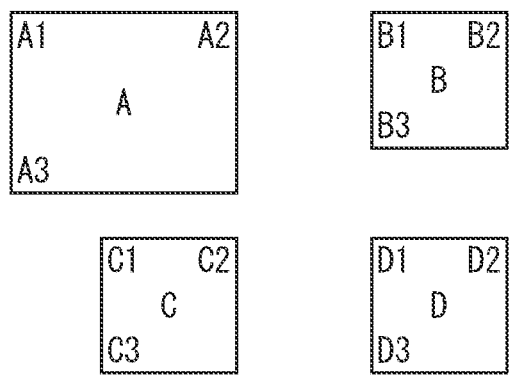
FIG. 1 illustrates four two-dimensional codes disclosed in Patent Literature 1 that are arranged adjacent to each other and photographed in a single image, which two-dimensional codes each comprising three position detection patterns of the same form at three of the four corners of a square.

FIG. 1 illustrates four two-dimensional codes disclosed in Patent Literature 1 that are arranged adjacent to each other and photographed in a single image, which two-dimensional codes each comprising three position detection patterns of the same form at three of the four corners of a square. For description purposes, the four two-dimensional codes are illustrated in a simplified diagram.

As illustrated in FIG. 1, two-dimensional codes A, B, C and D are closely arranged in the same direction. The two-dimensional code A has three position detection patterns A1, A2 and A3, and the other two-dimensional codes B, C and D also each have three position detection patterns in the same manner. Only the two-dimensional code A has a different number of cells (version), and the distances between the position detection patterns therein are different. The three position detection patterns (A1, A2 and A3) have a prescribed positional relationship according to the specifications of the two-dimensional code A, and the position detection patterns of the other two-dimensional codes B, C and D all have a positional relationship according to the same specifications.

Upon reading, when the B3-D1 and C2-D1 and D1-D2 distances in FIG. 1 are all equal, as candidate combinations of the position detection patterns, for example, combinations of (D1, B3 and D2) and (A2, C2 and D2) are also detected in addition to four combinations of (A1, A2 and A3), (B1, B2 and B3), (C1, C2 and C3) and (D1, D2 and D3).

In the analysis of a two-dimensional code, three position detection patterns are identified based on the shape of the two-dimensional code and the cell coordinates are calculated from the three position detection patterns. Then, the recorded data are read from the values (light or dark) of the cells in the part other than the three position detection patterns of the two-dimensional code.

In the image example of FIG. 1, there are 12 position detection patterns of the same shape and combinations of three of the position detection patterns are selected; however, combinations of three position detection patterns include those that are clearly false, such as the combination of (A1, D1 and D3). In addition, as in the case of the combination of (C2, A2 and D2), there are many combinations of position detection patterns that have a correct relationship but are not contained in a single two-dimensional code. In the two-dimensional code of Literature 3, however, since the distances between the position detection patterns vary depending on the version of the code, such incorrect combinations cannot be excluded solely based on the distances between the position detection patterns. In this case, based on the cell coordinates calculated from three position detection patterns, it is necessary to judge the presence or absence of a two-dimensional code in a more detailed manner from the information stored in the code, and this leads to an increase in the analysis process. Thus, when there are many combinations that cannot be excluded solely based on the positional relationships of plural position detection patterns, there is a problem that a longer analysis time is required.

Figure 2:
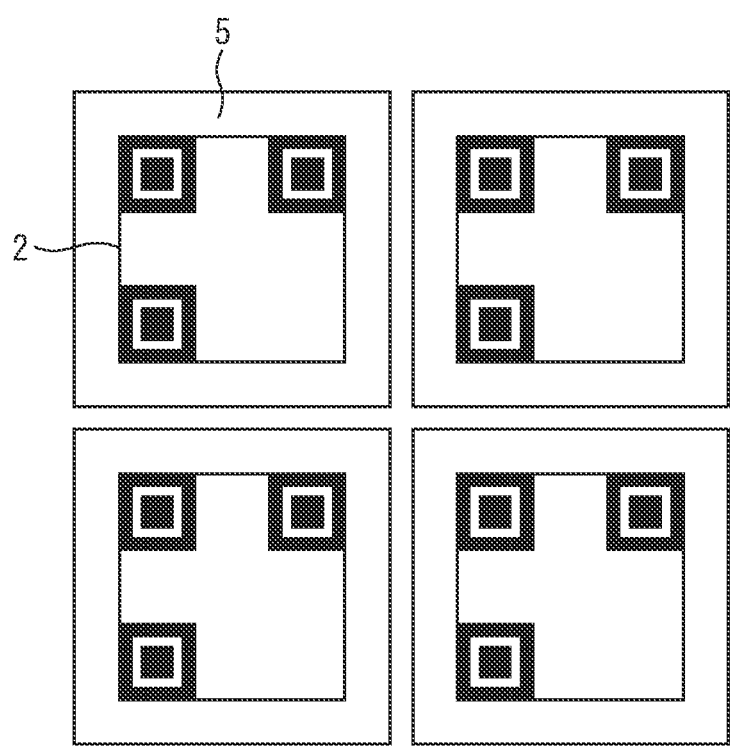
FIG. 2 illustrates a case where a plurality of the two-dimensional codes according to the first embodiment of the present invention are arranged in the same manner as in FIG. 1.

FIG. 2 illustrates a case where a plurality of the two-dimensional codes according to the first embodiment of the present invention are arranged in the same manner as in FIG. 1. The first characteristic feature of the present invention is that the distances between the position detection patterns do not change even when the version is changed to increase the amount of information to be recorded in the code. In other words, in conventional codes, since the distances between position detection patterns vary depending on the version number as in the case of FIG. 1, combinations that cause false detection such as the combination of (A2, B2 and C2) in FIG. 1, could not be excluded from the distance information. In the code of the present invention, as illustrated in FIG. 2, an increase in the information to be recorded in the code results in an increase in the size of the below-described peripheral section 5 which is arranged around the below-described basic pattern section 2 and where the increased information is recorded, and the dimensions and the shape of the basic pattern section that contains the position detection patterns are always fixed. Therefore, a greater number of combinations can be excluded from the candidate combinations of the position detection patterns by simple calculation of merely comparing distances between the position detection patterns.

As described above, since a greater number of combinations of the position detection patterns can be excluded by simple calculation, the two-dimensional code of the present invention is advantageous in shortening the analysis time for recognition of plural codes.

Figure 3A:
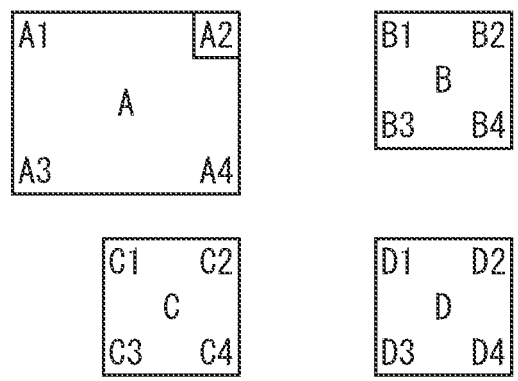
FIG. 3A illustrates a case where four of the two-dimensional codes according to the second embodiment of the present invention, each of which comprises position detection patterns all having different external shapes, are arranged in the same manner as in FIG. 1.
Figure 3B:
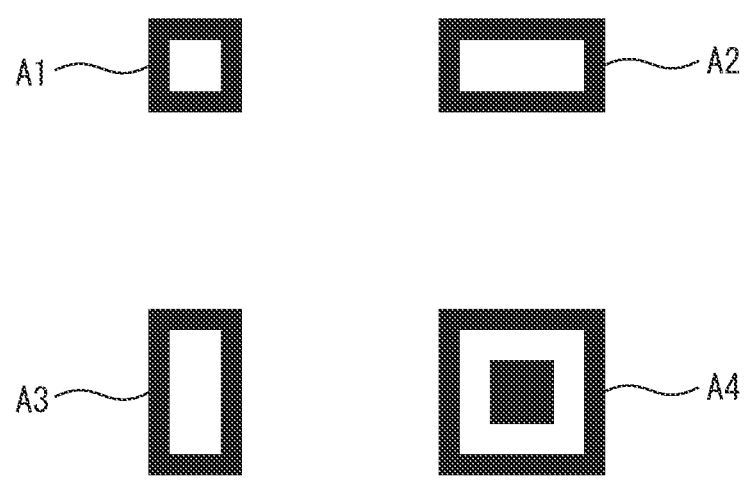
FIG. 3B illustrates the position detection patterns of the two-dimensional code A of FIG. 3A, all of which have different external shapes.

FIG. 3A illustrates a case where four of the two-dimensional codes according to the second embodiment of the present invention, each of which comprises position detection patterns all having different external shapes, are arranged in the same manner as in FIG. 1. FIG. 3B illustrates the position detection patterns of the two-dimensional code A of FIG. 3A, all of which have different external shapes. A position detection pattern A1 in FIG. 3A corresponds to A1 in FIG. 3B; a position detection pattern A2 in FIG. 3A corresponds to A2 in FIG. 3B; a position detection pattern A3 in FIG. 3A corresponds to A3 in FIG. 3B; and a position detection pattern A4 in FIG. 3A corresponds to A4 in FIG. 3B. The two-dimensional codes B, C and D also comprise the same position detection patterns. The second characteristic feature of the present invention is that, by allowing a plurality of position detection patterns contained in a single two-dimensional code to have different external shapes from one another, false candidate combinations of the position detection patterns are excluded. In other words, in conventional codes, a false combination such as the combination of (A2, B2, C2 and D2) in FIG. 1 could not be excluded. In the second embodiment, however, since the position detection patterns in a combination of (A2, B2, C2 and D2) that corresponds to the false combination in FIG. 3 all have the same external shape, this combination of the position detection patterns can be excluded. In the second embodiment, even when each code comprises three, not four, position detection patterns of different external shapes, false combinations can be excluded in the same manner based on the external shapes of the position detection patterns.

The effect of reducing the number of combinations in the above case will now be indicated with numerical values.

As illustrated in FIG. 1, when there are 4 two-dimensional codes and each code has 3 position detection patterns, a photographed image of the codes includes a total of 12 position detection patterns. It is assumed that, for all combinations of 3 of the 12 position detection patterns, whether or not a given combination belongs to the same two-dimensional code is checked. In this case, there are $_{12}C_3=220$ combinations. When each two-dimensional code has 4 identical position detection patterns, the number of position detection patterns in the photographed image is 16 and there are $_{16}C_4=1,820$ combinations of the position detection patterns.

In contrast, when the position detection patterns all have different external shapes, there are 64 combinations ($=_4C_1 \times _4C_1 \times _4C_1$) with each code having 3 position detection patterns, or 256 combinations ($=_4C_1 \times _4C_1 \times _4C_1 \times _4C_1$) with each code having 4 position detection patterns; therefore, it is seen that the number of combinations is considerably reduced.

The characteristic features of the first and second embodiments will be described separately; however, a code having both characteristic features is naturally feasible and the effects of both characteristic features yield a code that is further suitable for the process of recognizing plural codes.

Figure 4:
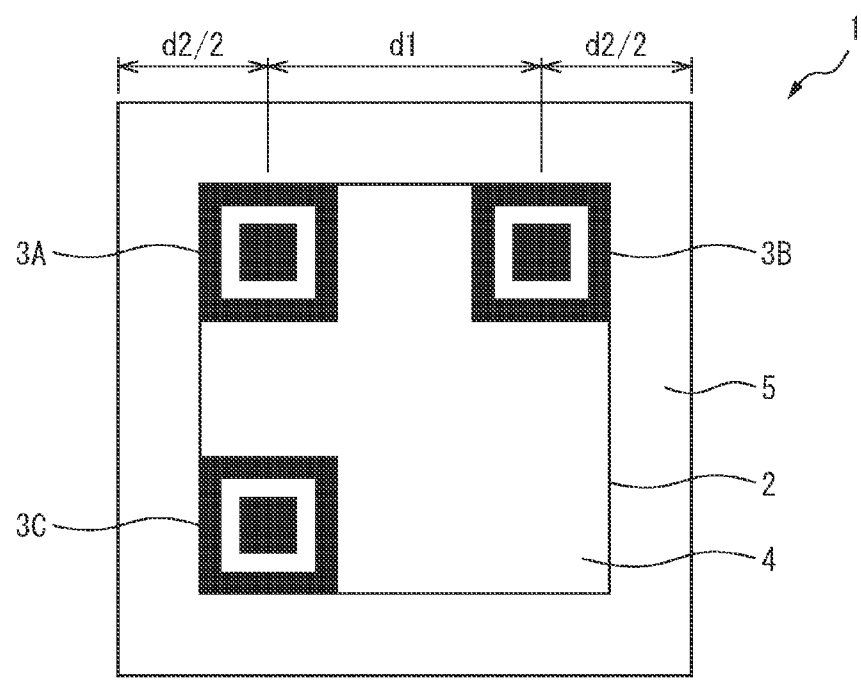
FIG. 4 illustrates the configuration of the two-dimensional code according to the first embodiment.

FIG. 4 illustrates the configuration of one example of the two-dimensional code according to the first embodiment.

A two-dimensional code 1 of FIG. 4 is a square two-dimensional code comprising cells representing binary-coded data that are arranged as a pattern in the form of a two-dimensional matrix, and the two-dimensional code 1 has a square basic pattern section 2 of a certain form and a peripheral section 5 arranged around the basic pattern section 2. The basic pattern section 2 has three position detection patterns 3A to 3C for specifying the cell positions. The term "certain form" used herein means that the dimensions and the shape are fixed. The part of the two-dimensional code 1 that excludes the position detection patterns 3A to 3C is divided into cells, and information (data) are recorded using light and dark cells. The part of the basic pattern section 2 that excludes the position detection patterns 3A to 3C is a data region 4. The data region 4 contains specification data and, as required, actual data. The specification data includes information relating to the data arrangement of the peripheral section 5, such as version information that determines the size of the peripheral section 5 to be formed outside the basic pattern section 2. The peripheral section 5 contains actual data, and the actual data in the data region 4 and the actual data in the peripheral section 5 represent the information of the two-dimensional code. In the present specification, a two-dimensional code of a square form will be described as an example; however, the two-dimensional code may be a rectangular form, and the rectangular form encompasses a square form as well.

In the same manner as the position detection patterns described in Patent Literature 1, the position detection patterns 3A to 3C each have a square dark part arranged in the center and a square frame-form dark part arranged outside the square dark part, with the space therebetween being a light part. In FIG. 4, with respect to the position detection pattern 3A, the position detection patterns 3B and 3C are arranged adjacently in the lateral and vertical directions, respectively.

A configuration having a large effect of excluding candidate position detection patterns will now be described. As illustrated, the distance between the centers of the position detection patterns 3A and 3B is "d1"; the distance between the position detection pattern 3A and the boundary of the two-dimensional code 1 on the left side is "d2/2"; and the distance between the position detection pattern 3B and the boundary of the two-dimensional code 1 on the right side is "d2/2". Accordingly, the width of the two-dimensional code 1 in the lateral direction is "d1+d2". The two-dimensional code 1 of the present embodiment is configured such that d2 is greater than d1 (d1<d2). In other words, the distance between two points at which a straight line connecting the centers of the position detection patterns 3A and 3B intersects the boundary between the rectangular (square) two-dimensional code 1 and the outside is greater than twice the distance between the centers of the two position detection patterns 3A and 3B.

Although not illustrated in the figure, the distance between the centers of the position detection patterns 3A and 3C is "D1"; the distance between the position detection pattern 3A and the boundary of the two-dimensional code 1 on the upper side is "D2/2"; and the distance between the position detection pattern 3C and the boundary of the two-dimensional code 1 on the lower side is "D2/2" (wherein, D=d). Accordingly, the width of the two-dimensional code 1 in the lateral direction is "D1+D2" and the two-dimensional code 1 of the present embodiment is set such that D2 is greater than D1 (D1<D2), so that the above-described condition is satisfied.

When the distance between the centers of position detection patterns is greater than d1, it can be judged that the position detection patterns belong to different two-dimensional codes; however, with the condition of d1<d2 being satisfied for all two-dimensional codes, since there is no case where position detection patterns of different two-dimensional codes have a distance of d1 between the centers thereof, it is easier to exclude such combinations of position detection patterns.

Next, the conditions for distinguishing position detection patterns of different two-dimensional codes when the two-dimensional codes of FIG. 4 exists adjacent to each other in an image will be described.

Figure 5A:
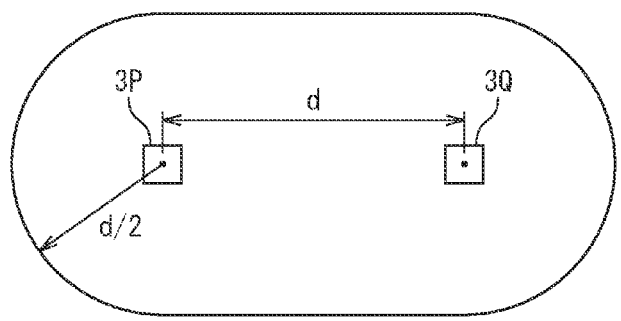
FIG. 5A is a drawing (1) that illustrates the conditions for distinguishing position detection patterns of different two-dimensional codes in a configuration that has a large effect of reducing candidate position detection patterns.
Figure 5B:
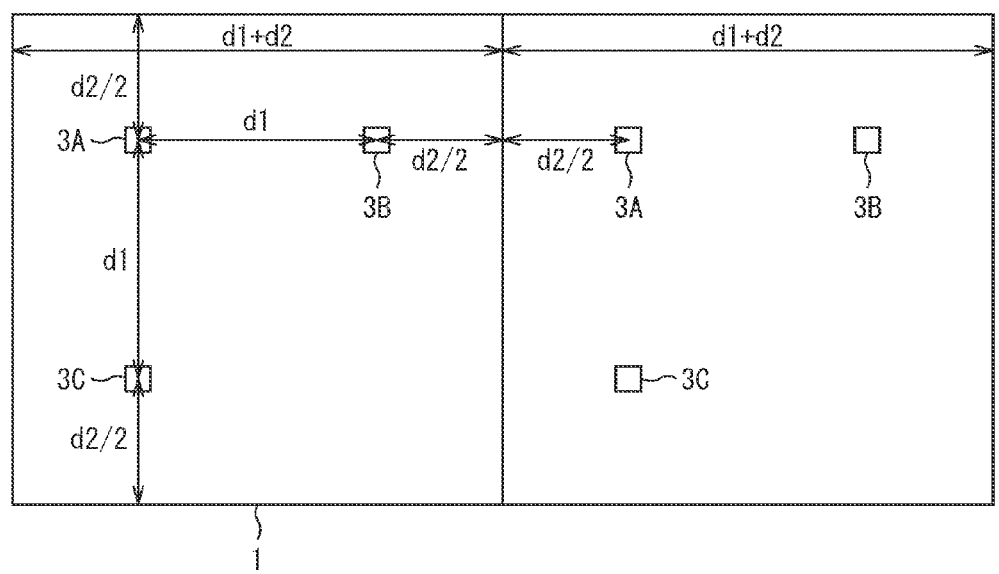
FIG. 5B is a drawing (2) that illustrates the conditions for distinguishing position detection patterns of different two-dimensional codes in a configuration that has a large effect of reducing candidate position detection patterns.

FIGS. 5A and 5B illustrate the conditions of a configuration having a large effect of reducing candidate position detection patterns.

As illustrated in FIG. 5A, it is assumed that a single two-dimensional code comprises two position detection patterns 3P and 3Q and the distance between the their centers is "d". As illustrated, it is also assumed that there is no other two-dimensional code in an elliptical area that is formed by semicircles of "d/2" in radius centered about the position detection patterns 3P and 3Q and a rectangle connecting the semicircles. In other words, the boundary between this two-dimensional code and the outside (the boundary between the peripheral section and the outside) exists outside this elliptical area. It is further assumed that other two-dimensional codes also have the same conditions. In this case, none of the position detection patterns of other two-dimensional codes has its center at a distance of shorter than "d" from the centers of the position detection patterns 3P and 3Q. In other words, by setting each two-dimensional code to have its boundary outside the area of FIG. 5A for all combinations of plural position detection patterns, it can be determined whether or not given position detection patterns belong to the same two-dimensional pattern based on the distance between the position detection patterns. Actually, taking into consideration errors in the determination, it is required to set the boundaries of the two-dimensional codes with a certain margin.

The above-described conditions of the square two-dimensional codes assume that, as illustrated in FIG. 5B, the centers of the four position detection patterns 3A to 3C constitute the apexes of a rectangle and the external shape (boundary with the outside) of the two-dimensional code 1 is also an analogous square. In this case, with the distance between the centers of the position detection patterns 3A and 3B in the lateral direction being defined as "d1", the lateral width of the two-dimensional code 1 is "d1+d2", wherein d1<d2. The same conditions apply for the vertical direction as well. When these conditions are satisfied in both directions, position detection patterns 3S and 3T in the oblique direction also satisfy the same conditions.

The above descriptions relate to square two-dimensional codes; however, rectangular two-dimensional codes are also included in the present invention. In other words, rectangles in the present invention include squares.

Figure 6:
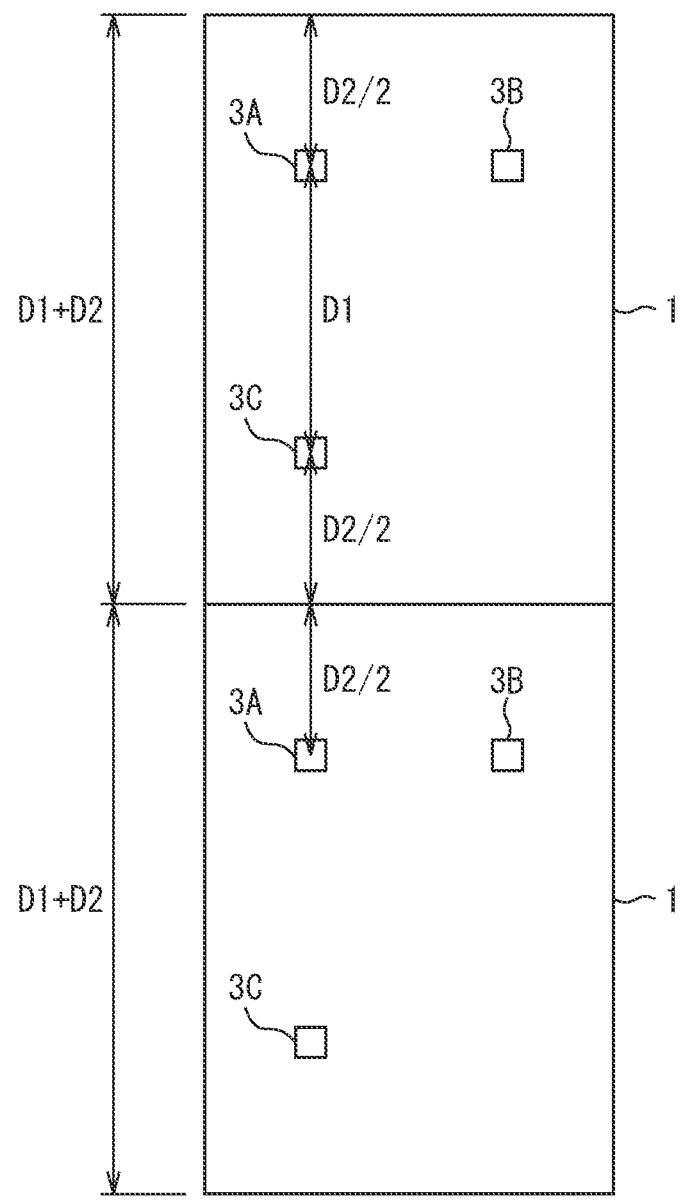
FIG. 6 illustrates the conditions of FIG. 5B for a vertically-elongated rectangular two-dimensional code.

FIG. 6 illustrates the conditions of FIG. 5B for a vertically-elongated rectangular two-dimensional code. The same conditions as FIG. 5B apply for the lateral direction. As for the vertical direction, with the distance between the centers of the position detection patterns 3A and 3C being defined as as long as the two-dimensional code 1 has a vertical width of "D1+D2" wherein D1<D2, these position detection patterns can be distinguished from the position detection patterns of other two-dimensional code based on the distance between the centers thereof. In the case of FIG. 6 as well, the same conditions are satisfied in the oblique direction. In this manner, even when the version is modified, by allowing the position detection patterns to have a certain distance therebetween and adopting the above-described code design, a code that is further suitable for recognition of plural codes is attained.

In the above, a case where the external shape of the two-dimensional code and the shape of the basic pattern section are analogous and plural position detection patterns are arranged at the corners of the basic pattern section was described; however, the present invention is not restricted thereto. For example, it is not necessary to arrange the plural position detection patterns at the corners of the basic pattern section and, as long as the above-described conditions are satisfied, the plural position detection patterns may be arranged at positions inside the basic pattern section away from the boundary between the basic pattern section and the peripheral section.

Further, it is not required that the center of the basic pattern section coincides with the center of the two-dimensional code.

Figure 7A:
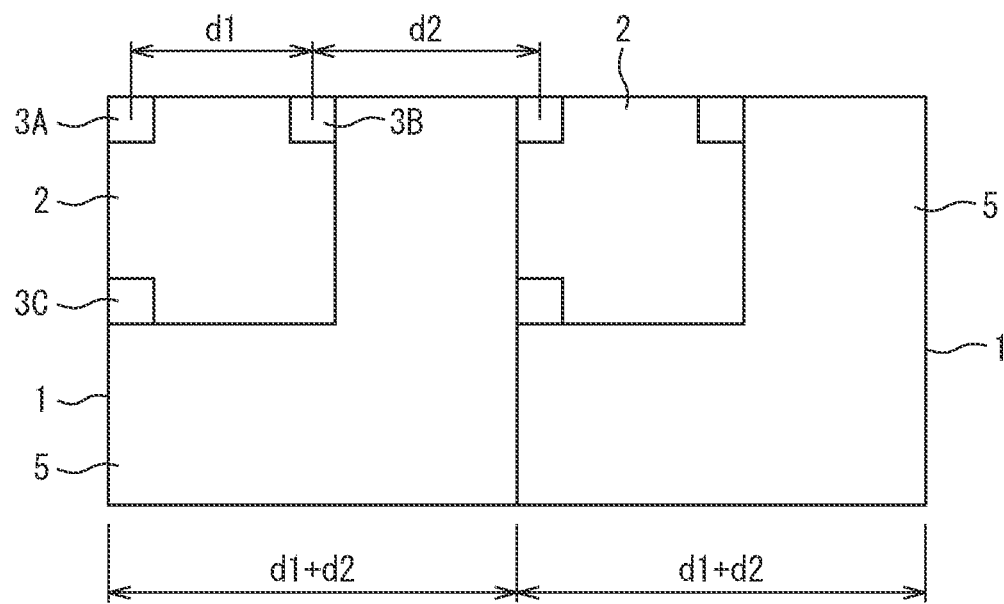
FIG. 7A is a drawing (1) that illustrate a case where the center of the basic pattern section and that of a two-dimensional code do not coincide (are relatively displaced) with each other.

FIGS. 7A and 7B each illustrate a case where the center of the basic pattern section and that of the two-dimensional code do not coincide (are relatively displaced) with each other.

As illustrated in FIG. 7A, the square basic pattern section 2 is arranged such that its upper left apex coincides with that of the square two-dimensional code 1. In this case as well, with the distances between the position detection patterns in the lateral and vertical directions being defined as "d1", the two-dimensional code 1 satisfies the condition of having both lateral and vertical widths of "d1+d2", wherein d1<d2. As long as this condition is satisfied, when other two-dimensional code is arranged adjacent thereto without changing the direction, the distance between a position detection pattern of the two-dimensional code 1 and that of the adjacent other two-dimensional code is d2 or greater, so that the position detection patterns of other two-dimensional code can be distinguished based on the distance between the centers.

However, as illustrated in FIG. 7B, when the four two-dimensional codes 1A to 1D are arranged such that they are rotated by 90° from one another and the basic pattern sections 2A to 2D are thus positioned adjacent to each other, such a state as described in FIG. 1 is created, so that these position detection patterns can no longer be distinguished from the position detection patterns of other two-dimensional code based on the distance between their centers.

Therefore, in cases where a two-dimensional code whose center is displaced from the center of its basic pattern section is used, it is desired to arrange the code with a restriction that other two-dimensional codes arranged adjacent thereto face the same direction. Here, rather than displacing the basic pattern section and the two-dimensional code such that they coincides at an apex as illustrated in FIG. 7A, the displacement is made such that the peripheral section exists outside the basic pattern section in all directions. In addition, the peripheral section is allowed to have a sufficiently large width in all directions so that the distance between the position detection patterns and the boundary of the two-dimensional code is greater than ½ of the distance between the centers of two position detection patterns. According to this configuration, even when other two-dimensional codes are rotated and arranged adjacent as illustrated in FIG. 7B, the position detection patterns of the other two-dimensional code can no longer be distinguished based on the distance between the centers.

In the above-described case, the three position detection patterns have the same form; however, the number of the position detection patterns may be 4 or more, and position detection patterns having different forms from one another may be arranged as well.

Figure 8:
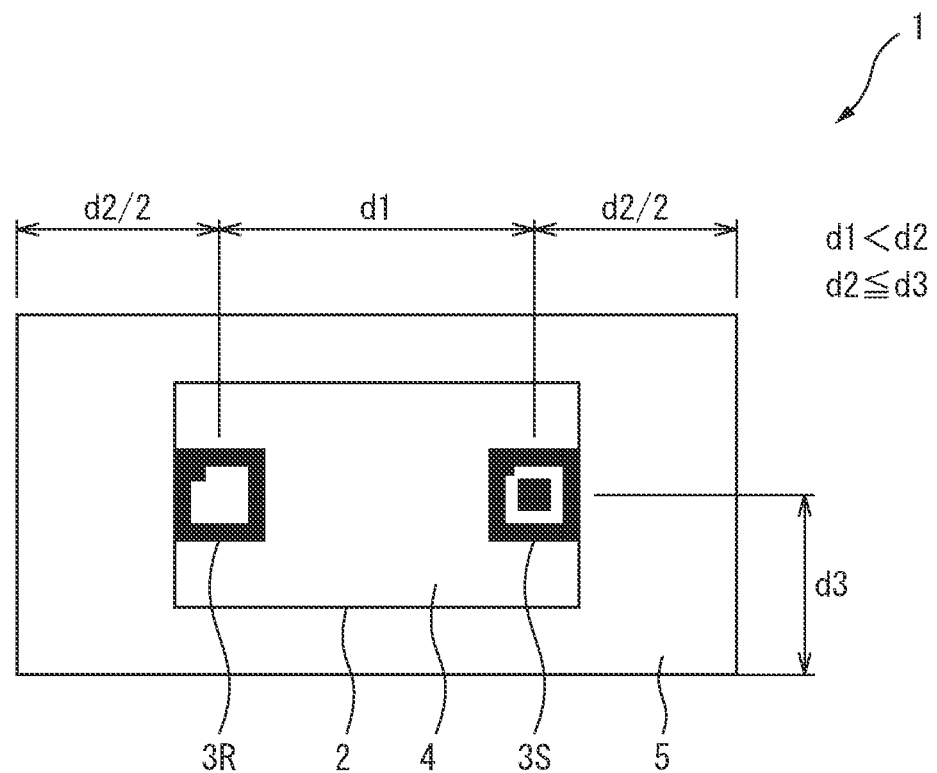
FIG. 8 illustrates a two-dimensional code comprising two position detection patterns whose directions can be specified.

FIG. 8 illustrates a two-dimensional code comprising two position detection patterns whose directions can be specified.

The two-dimensional code 1 of FIG. 8 is the same as the two-dimensional code of FIG. 4, except that the two-dimensional code 1 of FIG. 8 has two position detection patterns 3R and 3S of different forms whose directions can be specified. The two-dimensional code 1 of FIG. 8 also has the rectangular basic pattern section 2 of a certain form and the peripheral section 5 arranged around the basic pattern section 2. The basic pattern section 2 contains the two position detection patterns 3R and 3S of different forms for specifying the cell positions. The part of the basic pattern section 2 that excludes the position detection patterns 3R and 3S is the data region 4. The data region 4 contains specification data and, as required, actual data. The specification data includes information relating to the data arrangement of the peripheral section 5, such as version information that determines the size of the peripheral section 5 formed outside the basic pattern 2. The peripheral section 5 also contains actual data, and the actual data in the data region 4 and the actual data in the peripheral section 5 represent the information of the two-dimensional code.

In FIG. 8 as well, when the distance between the centers of the position detection pattern 3R and 3S is defined as "d1" and the distance between two points at which a straight line connecting the centers of the position detection patterns 3R and 3S intersects the boundary between the two-dimensional code 1 and the outside, i.e. the lateral width of the two-dimensional code 1, is defined as "d1+d2", by satisfying the condition of d1<d2, the number of candidates for the selection of a combination of position detection patterns is reduced and the process load can thus be reduced. In addition, since the position detection patterns 3R and 3S of FIG. 8 have different forms whose directions can be specified, two position detection patterns of a single two-dimensional code can be specified more easily.

The distance from the centers of the position detection patterns 3R and 3S to the upper or lower boundary of the two-dimensional code is defined as "d3". As long as d3 is not less than d2, even when other two-dimensional codes are arranged adjacent to the two-dimensional code 1 above and below, the number of candidates for the selection of a combination of position detection patterns can be reduced by comparing the distances.

Although the position detection patterns whose directions can be specified are used in FIG. 8, it is also considered allowing plural position detection patterns to have forms that are at least partially different and thus also making the positions of the corners of each basic pattern section specifiable. In this manner, in the two-dimensional code of the first embodiment, since the distances between the position detection patterns do not change even when the size of the code is modified, false detection can be eliminated based on the distances between the position detection patterns. A false combination of position detection patterns is excluded as a combination of position detection patterns that are not contained in a single two-dimensional code. Moreover, by designing the distances between the position detection patterns and the size of the peripheral section in the above-described manner, the effect of eliminating false detection based on the distances between the position detection patterns is further enhanced.

In the below-described two-dimensional code of the second embodiment, different position detection patterns are arranged at the respective corners.

Figure 9:
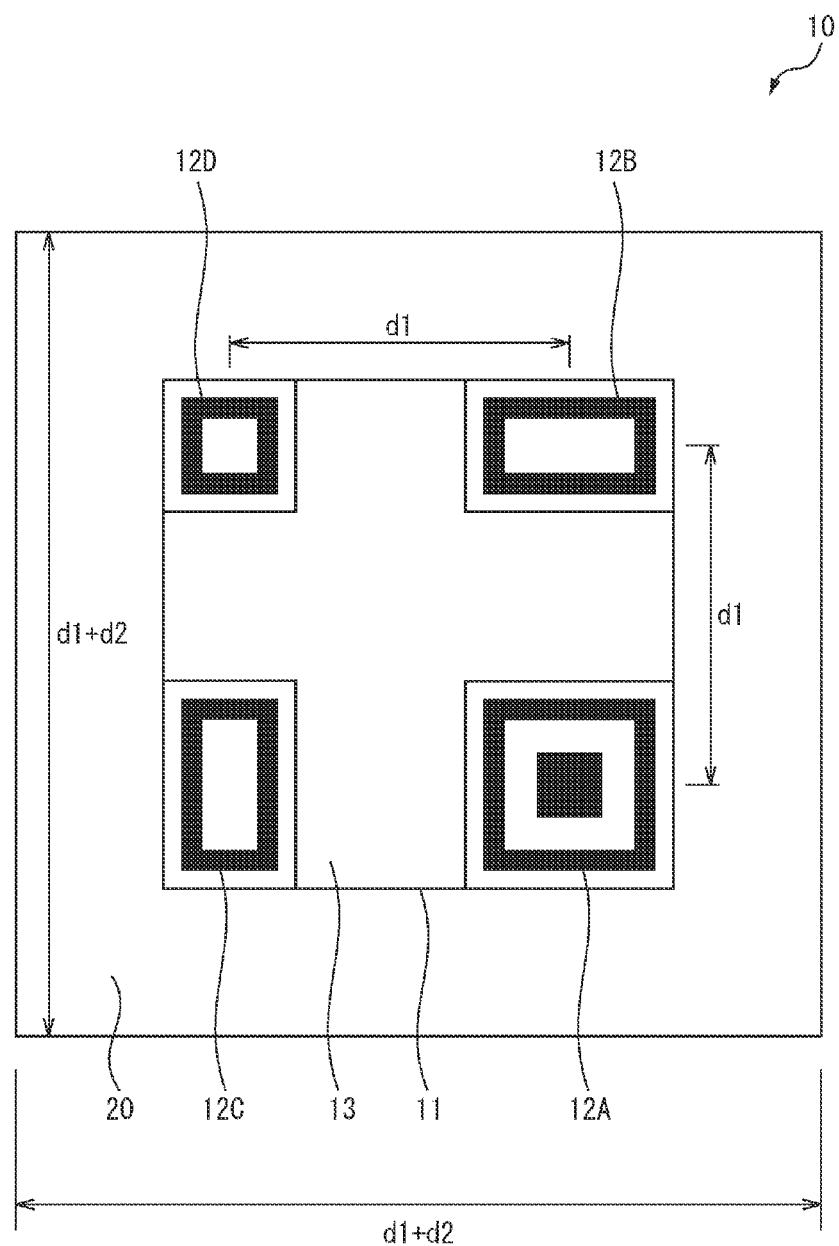
FIG. 9 illustrates the configuration of the two-dimensional code according to the second embodiment.

FIG. 9 illustrates the configuration of one example of the two-dimensional code according to the second embodiment.

A two-dimensional code 10 of the second embodiment is a two-dimensional code comprising cells representing binary-coded data that are arranged as a pattern in the form of a two-dimensional matrix, and the two-dimensional code 10 has a basic pattern section 11 of a certain form. The basic pattern section 11 comprises: position detection patterns 12A to 12D for specifying the cell positions; and combined data composed of specification data and actual data. Actual data that could not be stored in the basic pattern section are recorded in a peripheral section 20. In the data structure representing the combined data, the specification data and the actual data are clearly separated.

In FIG. 9, the region in the basic pattern section 11 that excludes the position detection patterns 12A to 12D, i.e. the region represented by the reference number 13, is a region of the combined data. In this region 13, the combined data composed of the specification data and the actual data are recorded. In the region 13, the below-described position correction pattern and separation pattern are further arranged as required. In addition, in the region 13, basic pattern section correction data for performing error correction of the combined data are also recorded. The specification data are recorded at prescribed positions within the region 13.

The amount of the specification data varies in accordance with the version information that determines the size of the peripheral section; the position information of the basic pattern section 11 in the two-dimensional code 10; and the data capacity of peripheral section error correction level information, blank-related information and the like. However, a change in the amount of the specification data is within the range that can be recorded in the data region 13. The actual data are recorded in the part of the region 13 where the specification data are not recorded. Accordingly, the amount of the actual data that can be recorded in the basic pattern section 11 is increased or decreased depending on the amount of the specification data. Thus, the amount of the actual data recorded in the basic pattern section 11 varies depending on the amount of the specification data and, when the data region 13 is filled with the specification data, there may be a case where the data region 13 contains no actual data.

The peripheral section 20 is the peripheral part of the basic pattern section 11 and also contains cells recording the actual data. When all of the actual data cannot be recorded in the basic pattern section due to an increase in the specification data or actual data, the remaining actual data are recorded in the peripheral section 20.

The position detection patterns illustrated in FIG. 9 comprise: a first position detection pattern 12A in the form of having a square frame with a square arranged therein; a second position detection pattern 12D in the form of a square frame that is smaller than the first position detection pattern 12A; and rectangular third and fourth position detection patterns 12B and 12C. These four position detection patterns 12A to 12D are each arranged at four corners of the basic pattern section 11. In this case, it is desired that: the first position detection pattern 12A and the second position detection pattern 12D be arranged at opposite diagonal corners; the third position detection pattern 12B and the fourth position detection pattern 12C be arranged at opposite diagonal corners; the long side of the third position detection pattern 12B and that of the fourth position detection pattern 12C have the same length as the side of the first position detection pattern 12A; the short side of the third position detection pattern 12B and that of the fourth position detection pattern 12C have the same length as the side of the second position detection pattern 12D; one of the short sides of the third position detection pattern 12B and that of the fourth position detection pattern 12C be arranged on the extension of a side of the first position detection pattern 12A; and one of the long sides of the third position detection pattern 12B and that of the fourth position detection pattern 12C be arranged on the extension of a side of the second position detection pattern 12D. The position detection patterns 12A to 12D illustrated in FIG. 9 are easily recognizable independent of each other and, even when some of the position detection patterns are not recognizable due to contamination or the like, the coordinate positions of the cells in the two-dimensional code can be easily determined from a combination of other recognizable position detection patterns.

When the lateral distance between the centers of the position detection patterns 12A and 12C and between the centers of the position detection patterns 12B and 12D is defined as "d1", the two-dimensional code has a width of "d1+d2", wherein d1<d2, in both the lateral and vertical directions. By this, the number of candidates for the selection of a combination of position detection patterns is reduced and the process load can thus be reduced. In addition, since the position detection patterns 12A to 12D of FIG. 9 all have different forms, at the time of recognizing a plurality of the codes, four position detection patterns belonging to a single two-dimensional code are specified and the positions of the cells in the two-dimensional code are calculated more easily.

FIG. 10A illustrates an example of the structure of the data recorded in the two-dimensional code of the second embodiment. FIG. 10B illustrates an example of the structure of the actual data recorded in the two-dimensional code of the second embodiment.

As illustrated in FIG. 10A, all of the specification data are recorded in the basic pattern section 11 and the actual data are recorded in the remainder of the basic pattern section 11. The actual data that cannot be put into the basic pattern section are recorded in a peripheral section, which is formed around the basic pattern section. Since the amount of the specification data is variable, the boundary between the specification data and the actual data in the basic pattern section 11 changes in accordance with the amount of the specification data. When the data region 13 in the basic pattern section 11 is divided into blocks, the boundary between the specification data and the actual data may exist inside a block.

The specification data represent information relating to the data arrangement in the peripheral section. The specification data comprises, for example: vertical and lateral version information that determine the size of the peripheral section; peripheral section error correction level information if the amount of the error correction data of the peripheral section is variable; blank information that determines a block(s) in which the actual data of the peripheral section are not arranged (block information not functioning as data); and the basic pattern section displacement information.

The specification data represent the specifications of the two-dimensional code; however, when the basic pattern section 11 always has a certain form, it is regarded that the specification data substantially define the specifications of the peripheral section 20.

The amount of the specification data varies depending on the two-dimensional code 10 to be issued, and the specification data comprises information that affects the amount and arrangement of the data to be recorded in the peripheral section. Meanwhile, although the amount of the specification data varies, in the basic pattern section 11, the information contained in the specification data are arranged and recorded in a predetermined order. The actual data are recorded in the remainder of the data region 13 of the basic pattern section 11.

In the QR codes (registered trademark) described in Patent Literature 1 and the like, it is possible to measure the number of pixels of each position detection pattern and the number of pixels of the distance between position detection patterns from a photographed image and then calculate the version information included in the specification data. According to the QR code (registered trademark) standard (JIS X0510: 2004), this is described as a method for determining the provisional symbol version using the reference decode algorithm. This version information is determined based on the form of the two-dimensional code in a photographed image, and an error occurs when, for example, the code is photographed from diagonally above or the image is blurred with ink. Since it is also preferable that a two-dimensional code be photographed in a severe environment and recognized even when the printing thereof is very poor, in order to inhibit the occurrence of such an error, it is desired that the two-dimensional code comprise, as data, specification information such as version information along with redundancy required for reading.

As illustrated in FIG. 10B, as the actual data, segments each composed of a combination of a message and a message-modifying header (message type (message encode) and message size) are arranged as many as the number of the messages. The messages are the data to be stored in a two-dimensional code by the user, and a two-dimensional code can store a plurality of messages, with a segment being imparted to each message. In addition, as a special segment, a segment which contains only an end flag without any message is prepared and, when the actual data has an unused capacity, this end-flag segment is arranged therein, followed by padding. Thus, an end flag indicates the presence or absence of a message, and the end flag of the last segment is "true" and the end flag of any other segment is "false".

The specification data and actual data illustrated in FIG. 10A are divided into block units in accordance with the data capacity per block. In the same manner, the error correction data are also divided into block units.

The data are attached with error correction data. When Reed-Solomon codes are used as the error correction data, since error correction is performed word by word, it is desired that one word constitutes one block. When one word spans over a plurality of blocks, even if only one of the blocks is contaminated, all of the words associated with the block are subjected to the error correction, which impairs the correction efficiency. Contamination and spotlight-caused color fading that lead to correction are often concentrated in one spot and, by allocating one word to one block, an effect of putting together the data to be simultaneously corrected into one spot is attained, and this enables to perform the correction efficiently and improves the probability of the code to be recognized.

The specification data will now be further described. The amount of the specification data can be increased or reduced depending on the version information that determines the size of the peripheral section. In other words, by reducing the amount of the specification data in the basic pattern section when the peripheral section is small or absent or by increasing the amount of the specification data in the basic pattern section when the peripheral section is large, the amount of the specification data can be modified in accordance with the information capacity of the code. In cases where the amount of the specification data is fixed as in conventional codes, there is also a problem that the ratio of the amount of the specification data with respect to the area of the code is large when the code has a small size; however, this problem can be solved in the present embodiment.

As described above, the specification data contain version information, and the size of the two-dimensional code is determined based on the version information. For instance, when the version information includes two kinds of data, which are lateral version information representing the lateral size of the code and vertical version information representing the vertical size of the code, the code is a rectangle of an arbitrary size. The use of the version information enables to design the two-dimensional code to have a variable size with the distances between the plural position detection patterns being fixed.

Figure 11A:
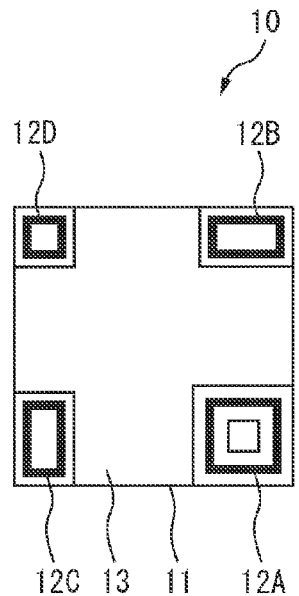
FIG. 11A is a drawing (1) that illustrates the changes in the peripheral section of the two-dimensional code in accordance with the version.
Figure 11B:
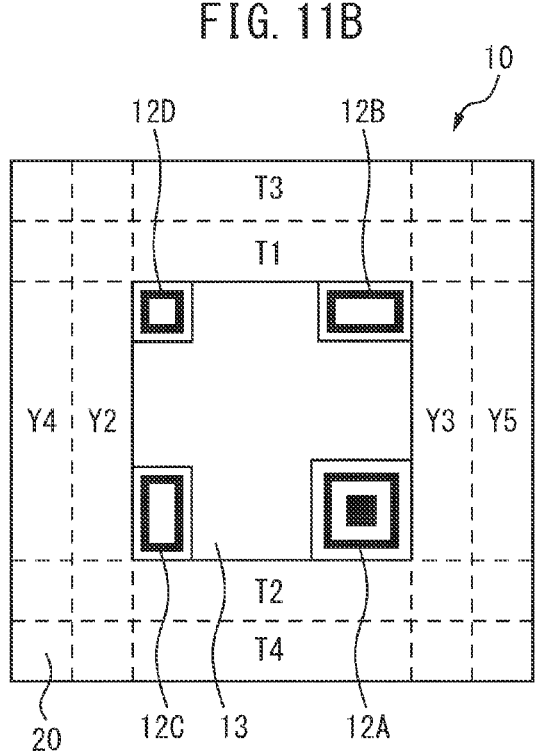
FIG. 11B is a drawing (2) that illustrates the changes in the peripheral section of the two-dimensional code in accordance with the version.

FIGS. 11A and 11B illustrate the changes in the peripheral section of the two-dimensional code in accordance with the version.

The two-dimensional code 10 of the second embodiment which has the minimum size is a code having only the basic pattern section 11 as illustrated in FIG. 11A, and such a minimum-size square two-dimensional code having only the basic pattern section 11 is hereinafter referred to as "version 1 (lateral)×1 (vertical)".

In the two-dimensional code 10 of the second embodiment, the size of the peripheral section 20 can be expanded in each of the vertical and lateral directions. When the lateral version is 2 and the vertical version is 3, the two-dimensional code is denoted as "version 2 (lateral)×3 (vertical)". Based on the version 1 (lateral)×1 (vertical) that has the same shape as the basic pattern section, the size of the whole two-dimensional code 10 increases as the version number increases. An increase in the version by 1 corresponds to an increase in the size by a single unit. In this example, the version can be selected to be, but not limited to, 1 to 26.

As illustrated in FIG. 11B, as for the increase in the lateral version, in accordance with the increase in the version number, the size of the peripheral section 20 in the lateral direction increases unit by unit alternately on each side in such a manner that one unit is added on the left side (Y2), then on the right side (Y3), then on the left side (Y4), then on the right side (Y5) and so on. In other words, when the version number increased by 1 is an even number, one unit is added on the left side. In the same manner, when the version number increased by 1 is an odd number, one unit is added on the right side. Accordingly, when the lateral version is an odd number, the width of the peripheral section 20 on the left side and that on the right side are the same, whereas when the lateral version is an even number, the left side of the peripheral section 20 is wider by one unit than the right side.

As illustrated in FIG. 11B, as for the increase in the vertical version, in accordance with the increase in the version number, the size of the peripheral section 20 in the vertical direction increases unit by unit alternately on each side in such a manner that one unit is added on the upper side (T1), then on the lower side (T2), then on the upper side (T3), then on the lower side (T4) and so on. In other words, when the version number increased by 1 is an even number, one unit is added on the upper side. In the same manner, when the version number increased by 1 is an odd number, one unit is added on the lower side. Accordingly, when the vertical version is an odd number, the width of the peripheral section 20 on the upper side and that on the lower side are the same, whereas when the vertical version is an even number, the upper side of the peripheral section 20 is wider by one unit than the lower side.

The position of this basic pattern section is defined as a prescribed position that serves as a reference in the displacement of the basic pattern section.

With regard to the change in the size of the two-dimensional code based on the change in the version, in addition to the above-described case where the size is increased unit by unit alternately, there may be a case where the size is increased alternately by two or more units at a time, a case where the size is increased unit by unit equally on each of the upper, lower, left and right sides, or a case where the size is increased only in a single direction, such as only in the upper and left direction or the lower and left direction. Further, when the version number is small, the size of the two-dimensional code may be changed unit by unit alternately on the upper and lower sides or on the left and light sides. When the version number is large, a variety of methods, such as a method of changing the size unit by unit equally on the upper and lower sides or on the left and light sides, can be considered.

Figure 12A:
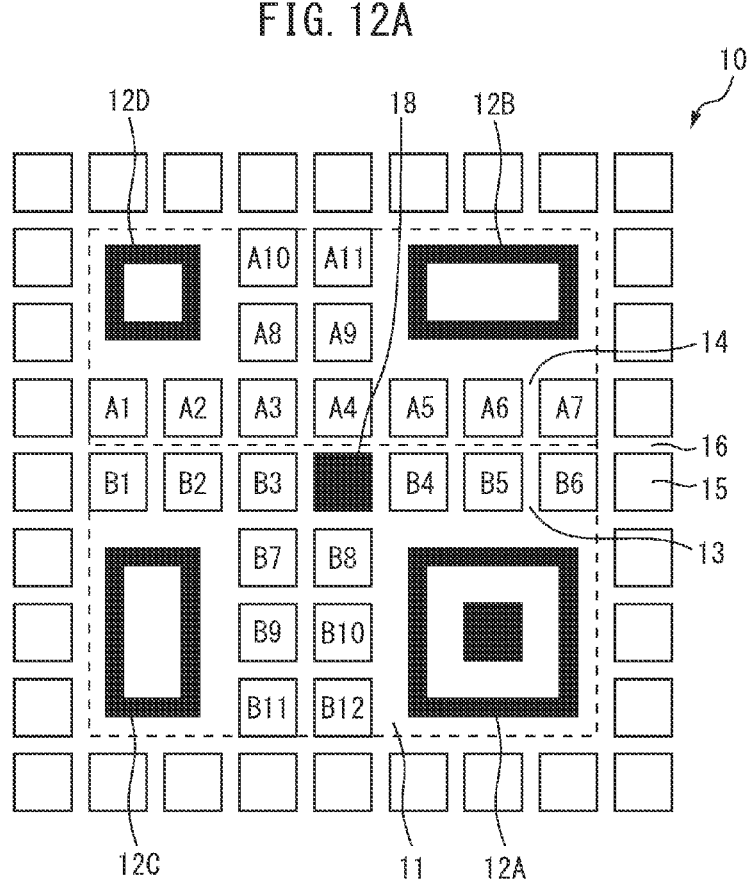
FIG. 12A illustrates the overall configuration of the basic pattern section of the two-dimensional code according to the second embodiment.
Figure 12B:
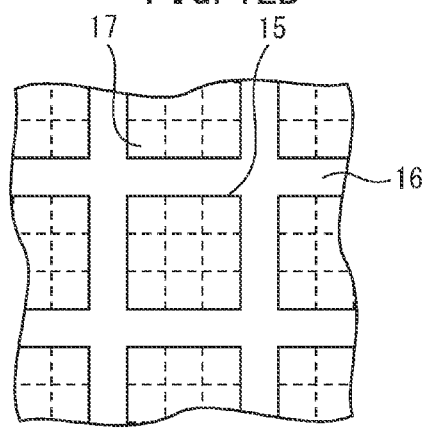
FIG. 12B illustrates the configuration of the basic pattern section of the two-dimensional code according to the second embodiment, depicting blocks and separation pattern.

FIG. 12A illustrates the overall configuration of the basic pattern section of the two-dimensional code according to the second embodiment. FIG. 12B illustrates the configuration of the basic pattern section of the two-dimensional code according to the second embodiment, depicting blocks and separation pattern.

In the example illustrated in FIG. 12B, the two-dimensional code 10 of the second embodiment comprises blocks each having a size of 3 lateral cells×3 vertical cells, and a separation space 16 has a width of a single cell. The basic pattern section 11 is the area enclosed by a dotted line and has a size of 7 lateral blocks×7 vertical blocks (27 lateral cells×27 vertical cells), and the position detection patterns 12A to 12D are arranged at four corners of the basic pattern section 11. The region of the basic pattern section 11 that excludes the position detection patterns 12A to 12D is the data region 13 of the basic pattern section 11. In the region 13, blocks A1 to A11 in a region 14 other than the position detection patterns 12B and 12D, which region 14 is on the upper side of the basic pattern section 11 and has a size of 7 lateral blocks×3 vertical blocks, are the blocks in which the combined data are recorded; and blocks B1 to B12 of a lower region of the basic pattern section 11 other than the position detection patterns 12A and 12C, which region has a size of 7 lateral blocks×4 vertical blocks, constitute a region 13 of the basic pattern section 11 where the basic pattern section error correction data (words) used for performing error correction of the combined data are recorded.

Each block is composed of 3 lateral cells and 3 vertical cells, and the blocks may be rectangular or have varying shapes.

In addition, although the cells are illustrated to be square, the cell shape is not restricted thereto.

Further, in the two-dimensional code 10 of FIG. 12A, since the blocks are separated from each other by the separation pattern 16, the four position detection patterns 12A to 12D all have a larger area than any of the blocks. As a result of this, a pattern that is identical to any of the position detection patterns never appears in the two-dimensional code, making the identification of the position detection patterns easy. Moreover, since the blocks 15 are separated from each other by the separation space 16, the accuracy of determining light and dark cells in each block 15 is improved particularly when the photographed image is blur and fuzzy.

In the region 13 of the two-dimensional code 10 of FIG. 12A, a block 18 is a position correction pattern. In this position correction pattern 18 (block 18), all of the 9 cells are dark; however, the form of the position correction pattern 18 is not restricted thereto, and the position correction pattern 18 may take any form as long as it can be identified as a position correction pattern.

When the coordinates of the center block of the basic pattern section is defined as "(CX, CY)", it is desired that the position correction pattern 18 be arranged in the block of (CX+7N, CY+7M) (wherein, N and M are each an integer, with a proviso that this block stays within the code). In the part outside the region of the two-dimensional code 10, no position correction block is arranged. In addition, the position correction pattern 18 is not arranged if it overlaps with a blank block or any of the position detection patterns. In FIG. 12A, the position correction pattern 18 wherein N=M=0 is arranged only in one block.

Incorporation of the position correction pattern enhances the redundancy and an improvement in the recognition accuracy can thus be expected. When one of the position detection patterns 12A to 12D is not recognized due to contamination, the position correction pattern 18 is found by estimating the position thereof from the other three position detection patterns that are recognizable. By performing two-dimensional projective transformation using a set of the four points composed of the three position detection patterns and one position correction pattern as a parameter, the accuracy of calculating each cell of the two-dimensional code 10 is improved. In this manner, in the two-dimensional code 10 of FIG. 12A, the accuracy of detecting the cell positions is further improved by arranging the position correction pattern 18.

As for the arrangement of the position detection patterns, there are other various combinations can be considered. Those combinations in which the total number of position detection patterns and position correction patterns is 5 and the number of the position detection patterns is 3 or less are all recognizable, although they have lower tolerance to contamination and the like than a combination of 4 position detection patterns and a single position correction pattern.

The position detection patterns and position correction pattern(s) are used for specifying the cell coordinates; however, their roles are different. It is desired that the position detection patterns be independently recognizable in the analysis and that no pattern of the same form appear in and out of the code. When false position detection patterns are detected, it is necessary to judge whether or not they belong to the same two-dimensional code and the analysis thus takes time. It is thus also desired that the position detection patterns do not have a complex form that requires a long time for identification or such a shape that is difficult to be separated from other parts of the code.

Meanwhile, the detection of the position correction pattern is performed after the position of the two-dimensional code is specified based on the position detection patterns. With the position of the position correction pattern being roughly known, the position correction pattern is found by searching a certain area. The position correction pattern enables to improve the accuracy of calculating the cell coordinates and to thereby increase the probability of the two-dimensional code to be recognized even when the cells are not uniform due to bending of the two-dimensional code.

The position correction pattern 18 is used for the purpose of correcting the coordinates of the actual data blocks and error correction code blocks, as well as the coordinates of the design-embedding information blocks and the like when a design is embedded. In the two-dimensional code 10, these coordinates can be roughly obtained from the position detection patterns 12A to 12D; however, since errors occur in the coordinates of the data region due to twisting or bending of the paper, distortion of the lens or displacement during acquisition of the position detection patterns, the position correction pattern 18 is arranged for correcting such errors. Since it is presumed that the coordinate relationship of the code in an image is roughly known from the position detection patterns 12A to 12D, the position correction pattern 18 is different from the position detection patterns 12A to 12D in that it is not required to be distinguished by itself from other noises, so that the position correction pattern 18 does not have to have a complex form. Meanwhile, it is desired that the position correction pattern 18 have such a form that allows fine coordinate corrections.

The basic pattern section 11 is not restricted to be positioned near the center with respect to the region of the two-dimensional code 10 and can be arranged at a position away from the center.

Figure 13:
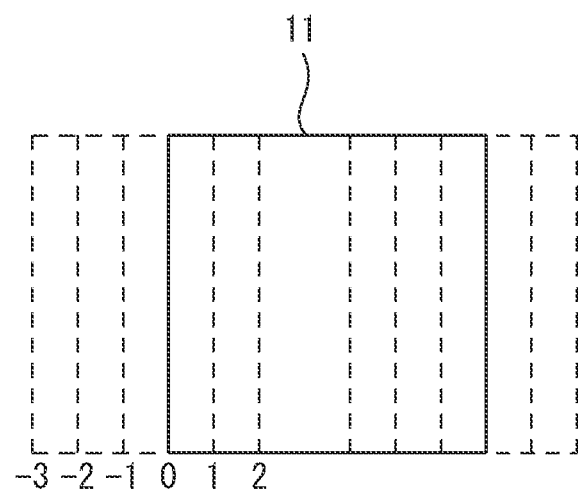
FIG. 13 is a drawing that describes how the position of the basic pattern section in the lateral direction is expressed by basic pattern section displacement information.

FIG. 13 is a drawing that describes how the position of the basic pattern section 11 in the lateral direction is expressed by the basic pattern section displacement information.

As illustrated in FIG. 13, the code of version 1 consists of only the basic pattern section 11, and a block row is added on the left or right side as the version number increases. The positions to which the basic pattern section 11 can be displaced are limited by the version number. For example, when the version number is 2, the basic pattern section 11 is either not displaced or can be displaced to the left by a single block row. When the version number is 3, the basic pattern section 11 is not displaced, or can be displaced to the left or right by a single block row. In other words, an increase in the version number by 1 corresponds to an increase of a single position to which the basic pattern section 11 can be displaced. Therefore, the amount of the data required for expressing the basic pattern section displacement amount information varies depending on the version number.

In FIG. 13, when the lateral version number is 6, the numerals of −3 to 2 represent the displacement amount information of the basic pattern section 11 at a block level. In accordance with the lateral version number, "0" represents the absence of displacement; a negative value represents the basic pattern section displacement amount information toward the left side; and a positive value represents the basic pattern section displacement information toward the right side.

The basic pattern section displacement information is composed of a basic pattern section displacement flag, which indicates the presence or absence of displacement, and basic pattern section displacement amount information that represents the amount of the displacement of the basic pattern section from a prescribed position. This prescribed position is the position of the basic pattern section in FIG. 11B. The basic pattern section displacement flag is 1-bit data having a state of "1" (presence of displacement) or "0" (absence of displacement). The basic pattern section displacement amount information exists only when the basic pattern section displacement flag is "1", and the basic pattern section displacement amount information can be omitted when the basic pattern section displacement flag is "0"

(absent). As a result, the amount of information can be reduced when the basic pattern section is not displaced, and the basic pattern section displacement amount information is recorded as specification data only when the basic pattern section is displaced. The basic pattern section displacement amount information indicates the amount of the displacement based on the position of the basic pattern section with no displacement.

When the basic pattern section is displaced, as for the basic pattern section displacement information, the basic pattern section displacement flag is assigned with "1", and information representing the amount of lateral displacement and information representing the amount of vertical displacement are recorded in the specification data as the basic pattern section displacement amount information.

When the basic pattern section is not displaced from a prescribed position, the basic pattern section displacement flag is assigned with "0", and the basic pattern section displacement amount information can be omitted.

Figure 14:
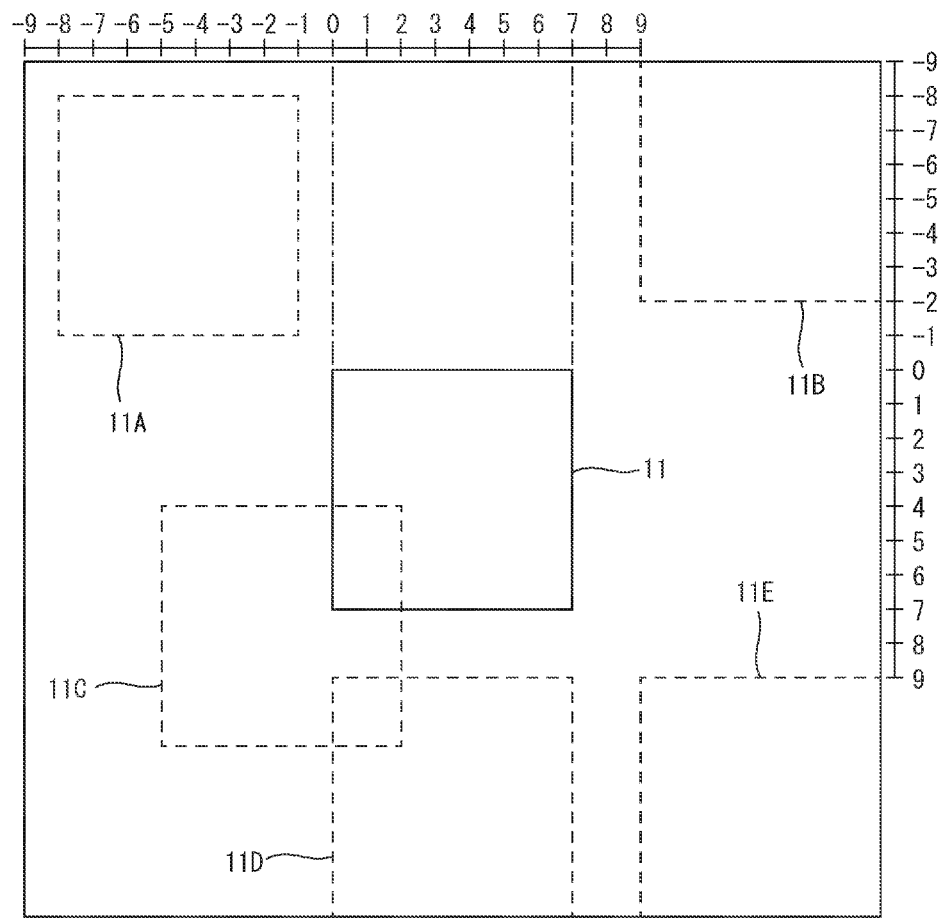
FIG. 14 illustrates cases where the basic pattern section is displaced in a two-dimensional code of version 19×19.

FIG. 14 illustrates cases where the basic pattern section 11 is displaced in the two-dimensional code 10 of version 19 (lateral)×19 (vertical).

In FIG. 14, the reference number 11 represents the basic pattern section 11 that is not displaced and, in this case, the position of the basic pattern section is 0 in the lateral direction and 0 in the vertical direction. The position of the basic pattern section 11 represented by the reference number 11A is −8 in the lateral direction and −8 in the vertical direction. The position of the basic pattern section 11 represented by the reference number 11B is 9 in the lateral direction and −9 in the vertical direction. The position of the basic pattern section 11 represented by the reference number 11C is −5 in the lateral direction and 4 in the vertical direction. The position of the basic pattern section 11 represented by the reference number 11D is 0 in the lateral direction and 9 in the vertical direction. The position of the basic pattern section 11 represented by the reference number 11E is 9 in the lateral direction and 9 in the vertical direction.

In the above, the displacement of the basic pattern section is represented using blocks as the unit; however, it may also be represented using cells as the unit.

Further, the unit of the displacement does not have to be 1 and may be a value of 2 or larger. In that case, in the two-dimensional code 10 of version 19 (lateral)×19 (vertical) illustrated in FIG. 14, there are 19 (lateral)×19 (vertical) combinations of displacement positions; however, by displacing the basic pattern section by a unit of 2 blocks, the number of combinations is reduced to 9 (lateral)×9 (vertical) and the amount of information in the specification data can thereby be reduced.

Moreover, the basic pattern section displacement amount information that represents the amount of the displacement from the center of the two-dimensional code is included in the above-described basic pattern section displacement information; however, basic pattern section position information that represents the position of the basic pattern section in the two-dimensional code may also be used in place of the basic pattern section displacement amount information.

The basic pattern section position information can indicate the block coordinates of the basic pattern section 11 based on a case where the upper left corner of the basic pattern section 11 is positioned at the block coordinates of (0,0) in the upper left of the code. For example, in the case of FIG. 16, since the upper left corner of the basic pattern section 11 is positioned at the block coordinates of (2,1), the data representing a displacement of 2 blocks in the lateral direction and 1 block in the vertical direction are recorded as the basic pattern section position information in the specification data.

As other method of expressing the basic pattern section position information, a method of defining the displacement pattern of the basic pattern section in advance may also be employed. For example, as the displacement pattern of the basic pattern section, four patterns of "upper left", "upper right", "lower left" and "lower right" are defined in advance and, with 2 bits being allocated to the basic pattern section position information, a value of 0 to 3 is assigned to each of the displacement patterns. In the two-dimensional code 10 of FIG. 14, when the value indicated by the basic pattern section position information corresponds to the "upper left" pattern, the basic pattern section is positioned at the block of −9 in the lateral direction and −9 in the vertical direction, while when the value corresponds to the "lower right" pattern, the basic pattern section is positioned at the block of 9 in the lateral direction and 9 in the vertical direction.

This method is advantageous in that it enables to always maintain the basic pattern section displacement amount information in 2 bits and the specification data can thereby be kept small.

Further, by defining a total of 5 patterns with addition of "center" to the above-described displacement patterns and omitting the basic pattern section displacement flag, the basic pattern section displacement information is always represented by 3 bits, so that the displacement of the basic pattern section can be realized using a small amount of information.

When a blank region is arranged in the code, as the information relating to this region, a blank-embedding flag that indicates the presence of a blank region and blank position information that represents the blank region-related information are included into the specification data. Meanwhile, when no blank region is arranged, only a blank-embedding flag that indicates the absence of a blank region is included into the specification data and the blank region-related information is omitted, whereby the amount of information in the specification data can be reduced. Further, when a blank region is arranged, by changing the number of bits also for the blank region-related information in accordance with the version information, the information efficiency of the specification data can be improved.

The specification data can be imparted with peripheral section error correction level information. This allows the amount of the error correction in the peripheral section actual data to be recorded as a peripheral section error correction level in the peripheral section error correction level information. For example, the peripheral section error correction level is selected from 4 levels of 10%, 20%, 30% and 40%. This enables to increase the error correction level for the recognition of the code used in an environment having poor photographing conditions or to lower the error correction level otherwise. In this case, 2 bits are secured for the peripheral section error correction level information in the specification data.

The peripheral section error correction level affects the amount of the peripheral section actual data in such a manner that the amount of the data is increased when the peripheral section error correction level is low, or it is reduced when the peripheral section error correction level is high.

When the code has no peripheral section (when the version is 1 (lateral)×1 (vertical)), the peripheral section error correction level information is not necessary and can thus be omitted from the specification data, so that the amount of the actual data can be increased by that much. The number of data-containing blocks in the peripheral section is determined by the version information, the blank information and the position correction patterns. As a result, the amount of data that can be recorded in the peripheral section is determined. Based on this data capacity of the peripheral section and the peripheral section error correction level information, the amount of the peripheral section actual data and that of the peripheral section error correction data are determined.

One example of the specification data, which are bit data representing the specification information, in the second embodiment will now be described. First, the lateral version information is input. The lateral version information has a value of 1 to 26 and represented by 2 to 9 bits. Next, the vertical version information is input by the same method. Then, the peripheral section error correction level information is input. The peripheral section error correction level information is represented by 2 bits and may take four peripheral section error correction levels. The peripheral section error correction level information will be described later. Subsequently, the blank-embedding flag that indicates the presence or absence of a blank region and the basic pattern section displacement flag that indicates the presence or absence of displacement of the basic pattern section from a prescribed position are input. The blank-embedding flag and the basic pattern section displacement flag are each represented by 1 bit, which is either "1" (presence) or "0" (absence). When the blank-embedding flag is "1", the blank position information that represents the position of the blank is added after the basic pattern section displacement flag. Thereafter, in cases where the basic pattern section displacement flag is "1", the basic pattern section displacement amount information is added after the blank position information when the blank-embedding flag is "1", or after the basic pattern section displacement flag when the blank-embedding flag is "0". Following these information, if the basic pattern section has a residual region where data can be stored, the actual data are further stored therein.

The types, order, data amount and flags of the specification information are not restricted to the above; however, it is required that the specification data yield the same interpretation in both the encoding and decoding processes.

As for the data arrangement in the peripheral section, in one example of the second embodiment, for example, the peripheral section actual data are sequentially recorded in each block in the direction from the upper left to the right and, once the recording is completed for one row, the remaining peripheral section actual data are sequentially recorded in each block of one row below in the left-to-right direction. After the peripheral section actual data, the peripheral section error correction data are recorded. In this process, no data is recorded in the basic pattern section, the blank region and the position correction patterns.

The above is just one example, and any method of arranging the data in the peripheral section may be employed as long as it is decided in advance.

Examples of the two-dimensional code 10 according to the second embodiment, which has a version that is effective for reducing the candidate combinations of the position detection patterns, will now be described.

Figure 15:
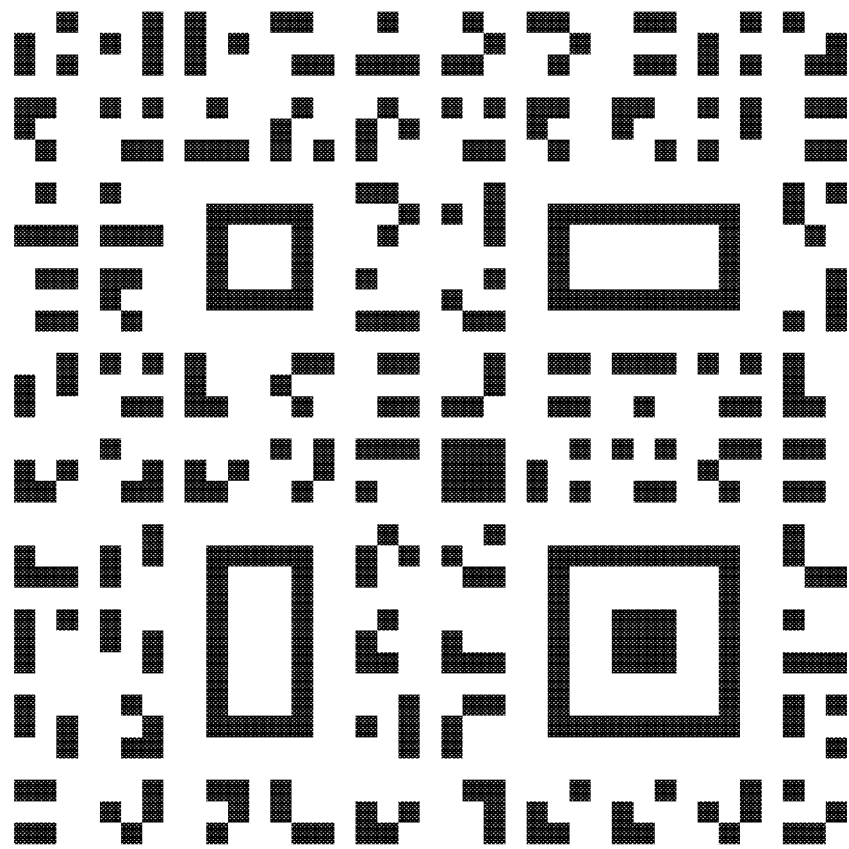
FIG. 15 illustrates an example of a two-dimensional code of version 4×4.

FIG. 15 illustrates an example of the two-dimensional code of version 4 (lateral)×4 (vertical). In the lateral direction, since the d1 is 18 cells and the d2 is a total of 21 cells with 11.5 cells on the left side and 9.5 cells on the right side, a condition of d1<d2 is satisfied. In the vertical direction as well, a condition of D1<D2 is satisfied in the same manner.

In other words, when the two-dimensional code of the second embodiment has a version of 4 or higher in both the lateral and vertical directions, the above-described conditions are always satisfied, so that a large effect can be attained. This does not change even when the basic pattern section is displaced.

Figure 16:
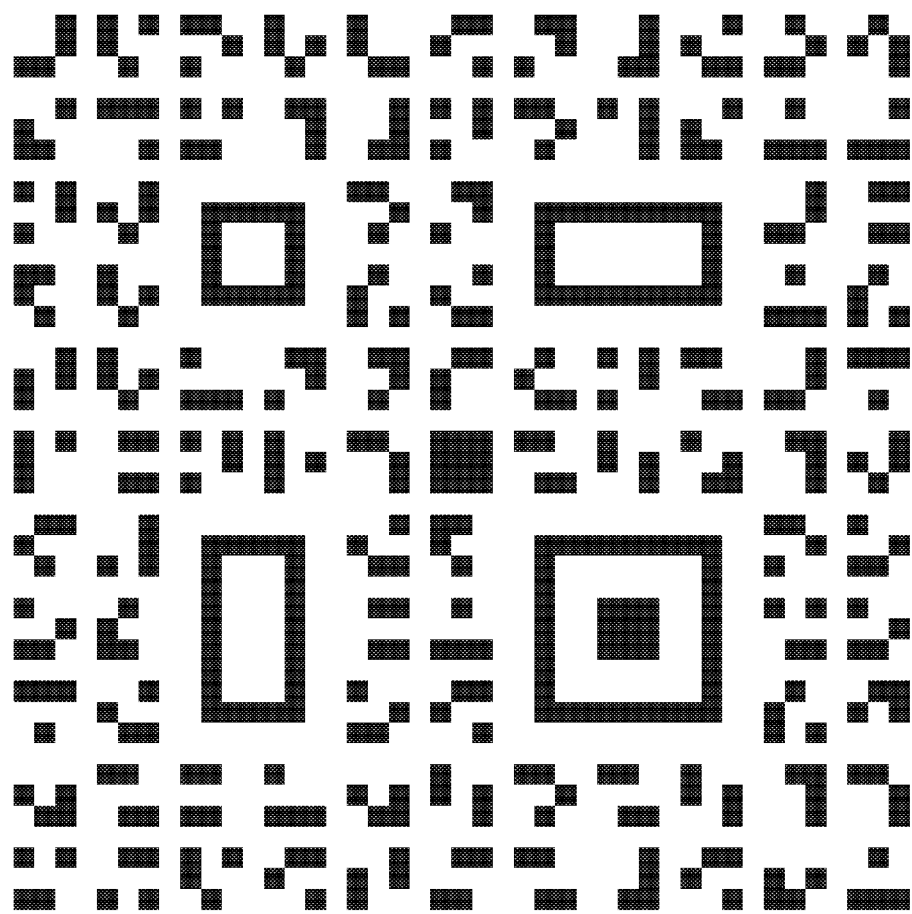
FIG. 16 illustrates an example of a two-dimensional code of version 5×5.

FIG. 16 illustrates an example of the two-dimensional code of version 5×5. In the same manner as in FIG. 15, the conditions of d1<d2 and D1<D2 are always satisfied.

Next, the process of generating the two-dimensional codes of the above-described embodiments (encoding process) will be described.

Figure 17:
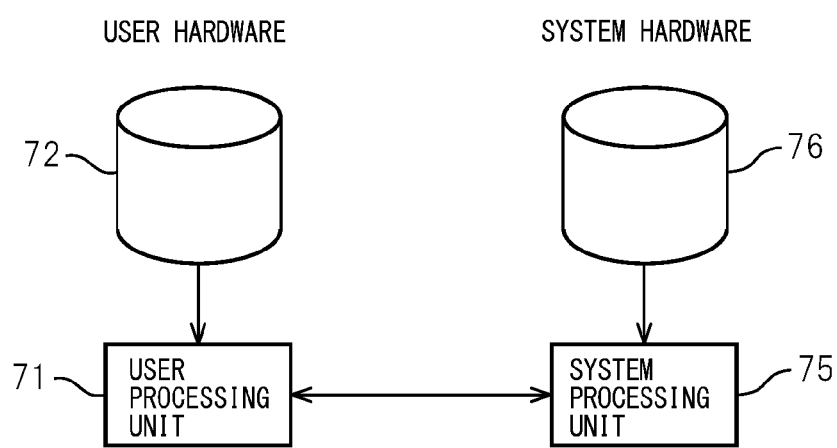
FIG. 17 illustrates a hardware configuration of a system for generating and providing a two-dimensional code.

FIG. 17 illustrates an example of a client-server configuration, which is a hardware configuration of a system for generating and providing a two-dimensional code.

The generation system comprises: a user hardware which is operated by a user who determines the specifications and requests a two-dimensional code to be generated; and a system hardware which generates and provides the requested two-dimensional code.

The user hardware comprises: a user processing unit 71, such as a computer; and a memory device 72, such as a magnetic disk.

The system hardware comprises: a system processing unit 75, such as a computer; and a memory device 76, such as a magnetic disk.

The user processing unit 71 and the system processing unit 75 are configured to allow communication therebetween, being connected through a communication line or the like.

Printing is performed on the user side; however, it may also be performed on the system side or at other printing place. The resulting two-dimensional code may be printed on any medium such as a sheet of paper, a resin plate or a casing surface. A design to be embedded may be printed on the medium in advance, and the two-dimensional code is printed after setting the medium such that the printed design to be embedded is fitted into the design region of the two-dimensional code.

Any printing apparatus can be employed as long as it is capable of printing a two-dimensional code on the above-mentioned media, and the printing apparatus may be, for example, a simple printer, a precision printers, or other printing apparatus capable of performing not only monochrome printing but also color printing. The generated two-dimensional code may also be transmitted to the user as two-dimensional code data through a communication line, without being printed. The user, as required, then transmits the data to a third party display or the like so that the generated two-dimensional code is displayed.

FIG. 17 illustrates an example of a generation system having a client-server configuration; however, the generation system is not restricted thereto. A variety of modifications can be made and the generation system may take, for example, a configuration in which a two-dimensional code is issued by an encoding software on a client's PC and then printed by a USB-connected printer or a configuration in which a two-dimensional code is issued from a hand-held terminal or printer. Further, the two-dimensional code generation process may be recorded on a computer-readable non-transitory recording medium as a program that can be executed by a computer.

Figure 18:
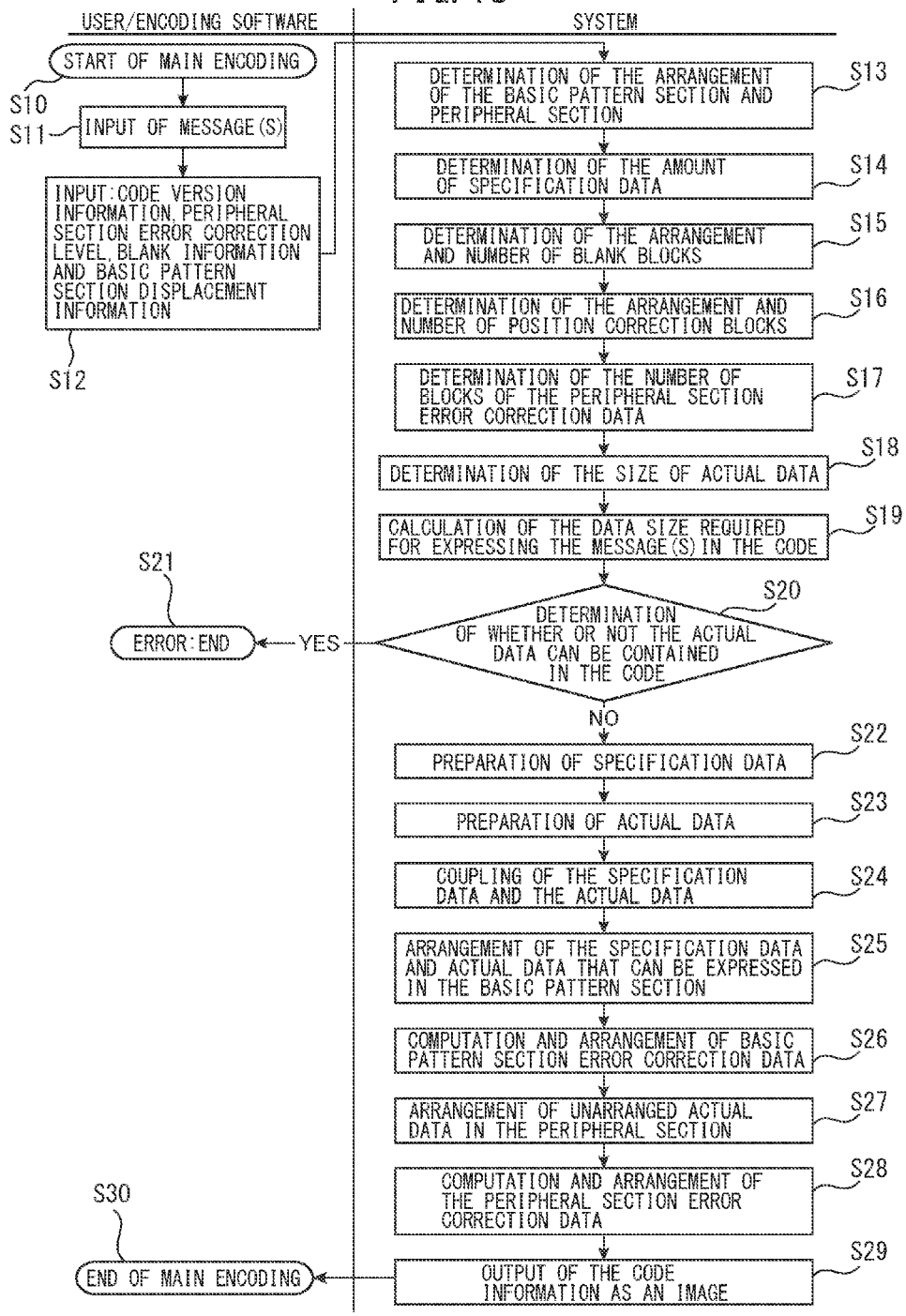
FIG. 18 is a flow chart illustrating the procedures of the encoding process in which a user accesses the system hardware via the user hardware and generates a desired two-dimensional code.

FIG. 18 is a flow chart illustrating the procedures of the encoding process in which a user accesses the system hardware via the user hardware and generates a desired two-dimensional code.

In the step S10, the user initiates the main encoding process.

In the step S11, the user inputs a message(s) to be recorded in a two-dimensional code.

In the step S12, the user inputs the version information, peripheral section error correction level, blank information and basic pattern section displacement information of the two-dimensional code. In response to this, the user processing unit 71 notifies the system processing unit 75 of the input message(s), version information, peripheral section error correction level, blank information and basic pattern section displacement information.

In the step S13, on the system side, the arrangement of the basic pattern section and the peripheral section is determined based on the transmitted information.

In the step S14, the amount of the specification data is determined based on the transmitted information.

In the step S15, on the system side, the arrangement and number of blank region blocks are determined based on the transmitted information.

In the step S16, the arrangement and number of position correction pattern blocks are determined.

In the step S17, from the peripheral section error correction level, the number of blocks of the peripheral section error correction data is determined.

In the step S18, the size of actual data that can be recorded in the two-dimensional code is determined.

In the step S19, the size of the actual data required for expression of the message(s) in the two-dimensional code is calculated.

In the step S20, it is assessed whether the actual data calculated in S19 can be contained in the data size of the two-dimensional code determined in S18 or the actual data calculated in S19 cannot be contained due to insufficient data size. When the data size is insufficient, the insufficiency of the data size is transmitted to the user processing unit 71, or when the data size is sufficient, the operation proceeds to the step S22.

In the step S21, the user processing unit 71 notifies the user of the occurrence of an error that the two-dimensional code of the input form does not have a sufficient data size for expressing the input message(s), and the operation is terminated.

In the step S22, the specification data are prepared.

In the step S23, the actual data are prepared.

In the step S24, the specification data and the actual data are combined.

In the step S25, the specification data and actual data that can be recorded in the basic pattern section are arranged in the basic pattern section.

In the step S26, based on the thus recorded data in the basic pattern section, the basic pattern section error correction data are computed and arranged.

In the step S27, the actual data that could not be stored in the basic pattern section are arranged as peripheral section actual data in the peripheral section.

In the step S28, based on the peripheral section actual data, the peripheral section error correction data are computed and arranged.

In the step S29, the information of the two-dimensional code is output to the user processing unit 71 as an image.

In the step S30, the main encoding process is completed.

Figure 19:
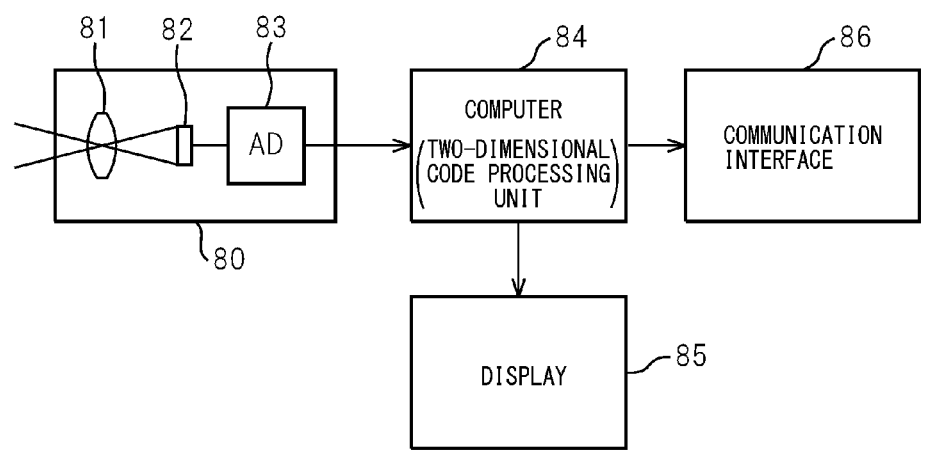
FIG. 19 illustrates a hardware configuration of a two-dimensional code analyzer which reads and analyzes the two-dimensional codes of the below-described embodiment.

FIG. 19 illustrates a hardware configuration of a two-dimensional code analyzer which reads and analyzes the two-dimensional codes of the above-described embodiments.

The two-dimensional code analyzer comprises: a reading unit 80; a computer (two-dimensional code analysis/processing unit) 84; a display 85; and a communication interface 86. The reading unit 80 comprises: a lens 81; an image sensor 82; and an analog-digital converter (AD) 83, and outputs digital image data of a photographed two-dimensional code to the computer 84. Such a two-dimensional code analyzer as illustrated in FIG. 19 is widely used and, in recent years, portable terminals have also realized the same functions as the two-dimensional code analyzer. Further, the two-dimensional code analysis process may be recorded on a computer-readable non-transitory recording medium as a program that can be executed by a computer.

Figure 20:
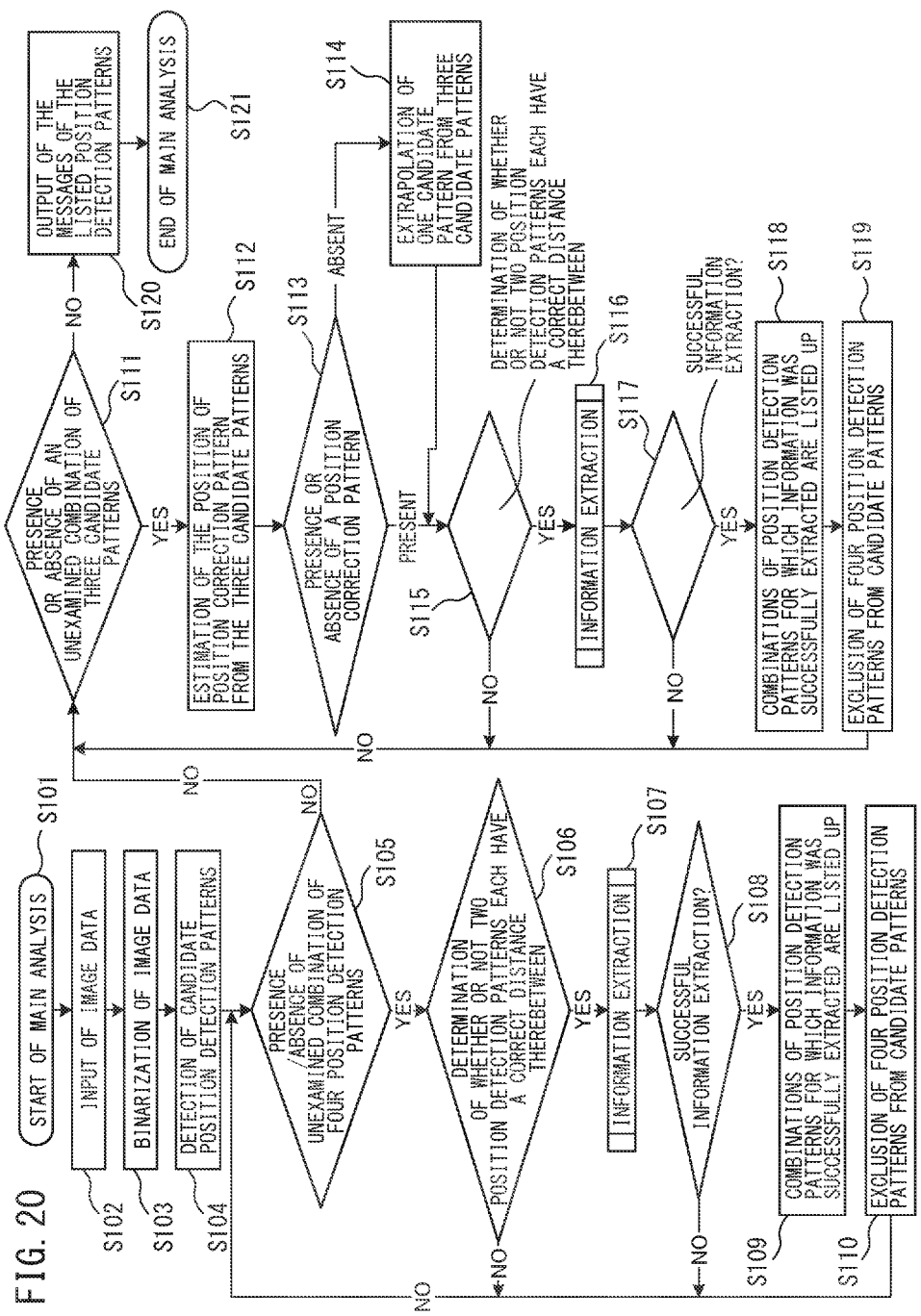
FIG. 20 is a flow chart illustrating the procedures of the decoding process in which a two-dimensional code photographed by a user is analyzed.
Figure 21:
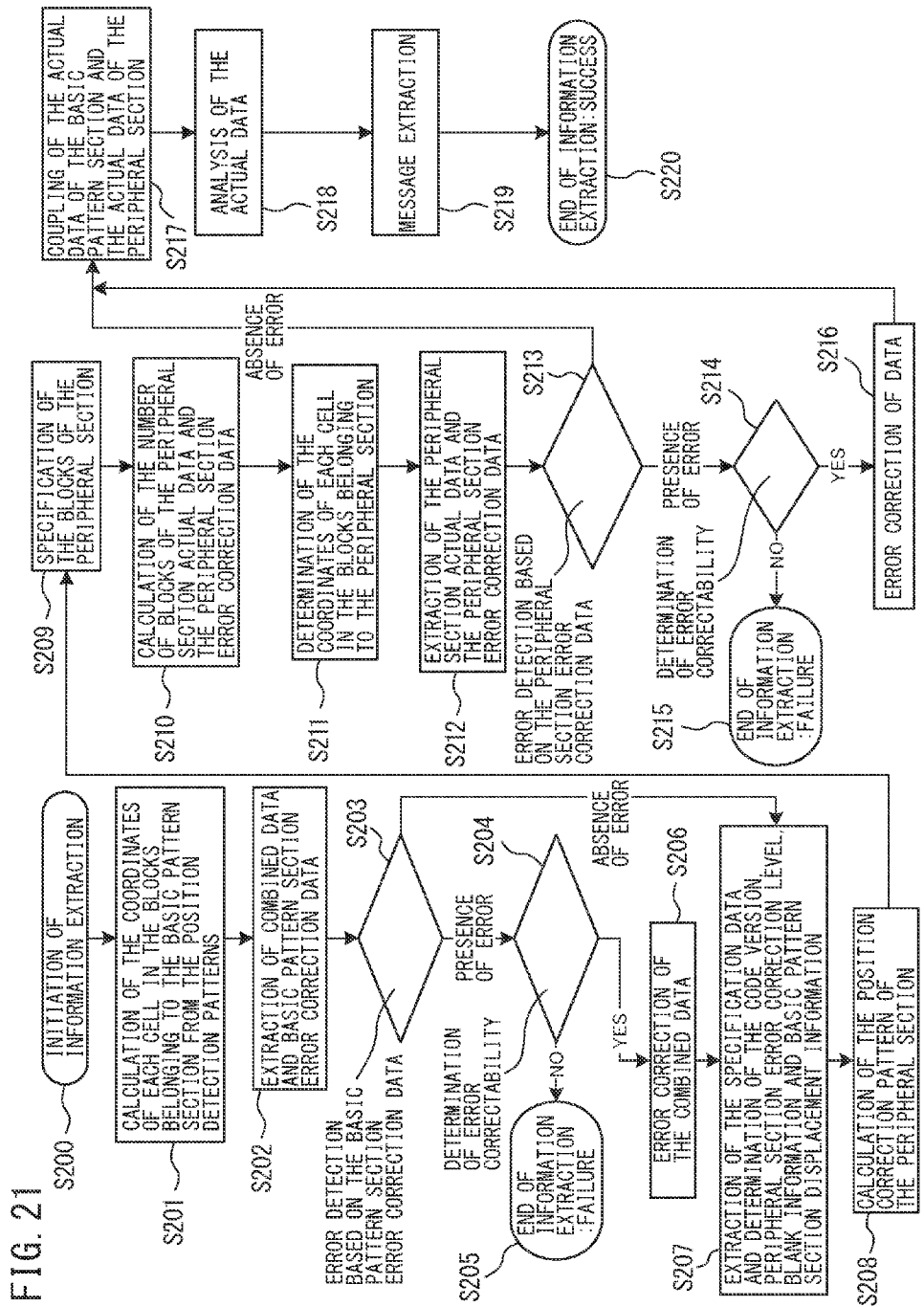
FIG. 21 is a flow chart illustrating the procedures of the decoding process in which a two-dimensional code photographed by a user is analyzed.

FIGS. 20 and 21 are flow charts illustrating the procedures of the decoding process in which a two-dimensional code photographed by a user is analyzed. This decoding process assumes a case where plural two-dimensional codes of the second embodiment are projected on a single screen. The decoding process consists of a main analysis process and an information extraction process. First, the main analysis process will be described.

In the step S101, the main analysis process is initiated.

In the step S102, a photographed image of the two-dimensional codes is input.

In the step S103, a binary image of the input photographed image is generated. As for the binarization method, when the input photographed image is a color image such as an RGB image, it is once converted into a gray-scale image. An average of the maximum and minimum brightness values in the image is taken as a threshold value, and those pixels with a value of not less than the threshold value are defined to be "light" and those pixels with a value of less than the threshold value are defined to be "dark". The gray-scale conversion of a color image is carried out using the RGB values of the respective pixels in accordance with a conversion formula: Brightness=0.299R+0.587G+0.114B. The conversion method is not restricted to the above-described one as there have been proposed a variety of methods for conversion of a color image into a gray-scale image as well as for further conversion of the gray-scale image into a binary image.

In the step S104, candidate position detection patterns are detected. Specifically, when the binarized image is scanned, those patterns in which a sequence of dark-light-dark pixels or dark-light-dark-light-dark pixels appears at a certain ratio are detected in the lateral and vertical directions of the scanning.

In the step S105, combinations of four position detection patterns are generated, and it is assessed whether or not there is any combination of four position detection patterns that has not be examined. If any, the operation proceeds to the step S106 and, if not, the operation proceeds to the step S110.

In the step S106, when there is even one combination in which any two position detection patterns have an inappropriate distance therebetween, this combination can be assessed as an incorrect combination. In this manner, false detection is eliminated based on the distances between the position detection patterns.

In the step S107, information is extracted for those combinations of position detection patterns that are assessed to be of the same two-dimensional code. This process will be described later referring to FIG. 21.

In the step S108, in accordance with the result of the information extraction, the operation proceeds to the step S109 when the extraction was successful, while when the extraction failed, the combinations of position detection patterns for which the extraction failed are excluded and the operation returns back to the step S105.

In the step S109, the combinations of position detection patterns for which information was successfully extracted are listed up.

In the step S110, the four candidate position detection patterns used in the two-dimensional pattern from which data were successfully extracted are excluded, and the operation returns back to the step S105. When an unused candidate position detection pattern exists in the range of the two-dimensional pattern from which data were successfully extracted, such a position detection pattern is also excluded from the candidates.

By repeating the steps S105 to S110, the assessment of whether or not each combination of four candidate position detection patterns in the projected two-dimensional codes belongs to the same two-dimensional code is completed.

In the step S111, it is assessed whether or not there is any combination of three candidate position detection patterns that has not be examined. If not, the operation proceeds to the step S120 and, if any, the operation proceeds to the step S112.

In the step S112, from the three candidate position detection patterns, the position of position correction pattern is estimated.

In the step S113, the presence or absence of a position correction pattern is assessed. If present, the operation proceeds to the step S115 and, if absent, the operation proceeds to the step S114.

In the step S114, from the three candidate position detection patterns, one candidate position detection pattern is extrapolated, and the operation then proceeds to the step S115.

In the step S115, when there is even one combination in which the distance between two position detection patterns is not appropriate, such a combination can be assessed as an incorrect combination. When extrapolation was performed using the position correction patterns and the like as well, the coordinates of the position detection pattern expected to be missing are estimated, and the distances are examined.

In the step S116, information is extracted for those combinations of position detection patterns that are assessed to be of the same two-dimensional code. This process will be described later referring to FIG. 21.

In the step S117, in accordance with the result of the information extraction, the operation proceeds to the step S118 when the extraction was successful, while when the extraction failed, those combinations of position detection patterns for which the extraction failed are excluded and the operation returns back to the step S111.

In the step S118, the combinations of position detection patterns for which information was successfully extracted are listed up.

In the step S119, the three candidate position detection patterns used in the two-dimensional pattern from which data were successfully extracted are excluded, and the operation returns back to the step S111. When an unused candidate position detection pattern exists in the range of the two-dimensional pattern from which data were successfully extracted, such a position detection pattern is also excluded from the candidates.

By repeating the steps S111 to S119, the assessment of whether or not each combination of three candidate position detection patterns in the projected two-dimensional codes belongs to the same two-dimensional code is completed.

In the step S120, the messages of the position detection patterns that were listed up are output, and the operation proceeds to the step S121.

In the step S121, the main analysis process is completed.

Next, the information extraction process of the steps S107 and S116 will be described referring to FIG. 21.

In the step S200, the information extraction process is initiated.

In the step S201, from the position detection patterns, the coordinates of the cells in the blocks belonging to the basic pattern section are calculated.

In the step S202, the combined data and the basic pattern section error correction data are extracted.

In the step S203, error detection is performed based on the basic pattern section error correction data and, the operation proceeds to the step S204 when there is an error, or the operation proceeds to the step S207 when there is no error.

In the step S204, it is determined whether or not the error is correctable based on the cell data in the blocks. When the error is not correctable, the operation proceeds to the step S205, while when the error is correctable, the operation proceeds to the step S206.

In the step S205, the failure of the information extraction from the two-dimensional code is notified, and the operation is terminated.

In the step S206, error correction of the combined data is performed.

In the step S207, the specification data are extracted from the combined data, and the version, peripheral section error correction level, blank information and basic pattern section displacement information of the two-dimensional code are specified.

In the step S208, based on the specification data, the position correction pattern of the peripheral section of the basic pattern section is calculated.

In the step S209, based on the specification data, the blocks of the peripheral section actual data, from which the position correction pattern and blank region of the peripheral section are excluded, and the blocks of the peripheral section error correction data are specified.

In the step S210, the total number of blocks of the peripheral section actual data and the peripheral section error correction data is calculated and, from the thus calculated value and the peripheral section error correction level, the number of blocks of the respective data is calculated.

In the step S211, the coordinates of the cells in the blocks belonging to the peripheral section are determined.

In the step S212, the peripheral section actual data and the peripheral section error correction data are extracted.

In the step S213, error detection is performed based on the peripheral section error correction data and, the operation proceeds to the step S214 when there is an error, or the operation proceeds to the step S217 when there is no error.

In the step S214, it is determined whether or not the error is correctable. When the error is not correctable, the operation proceeds to the step S215, while when the error is correctable, the operation proceeds to the step S216.

In the step S215, the failure of the information extraction from the two-dimensional code is notified, and the operation is terminated.

In the step S216, error correction of the data is performed.

In the step S217, the actual data of the basic pattern section, from which the specification data are excluded, and the actual data of the peripheral section are coupled together.

In the step S218, the actual data are analyzed.

In the step S219, the message(s) is/are extracted

In the step S220, since the information was successfully extracted from the two-dimensional codes, the operation is completed with display of the message(s).

According to the above-described two-dimensional codes of the first and second embodiments, even when the size of each two-dimensional code is different, the positional relationships of the plural position detection patterns used for calculating the positions of the cells in the basic pattern section are fixed; therefore, in the recognition of a plurality of the codes, the codes are more easily specified than a conventional two-dimensional code in which the positional relationships of the position detection patterns vary depending on the size of the two-dimensional code. Further, since the position detection patterns contained in the above-described codes have different forms from one another, in the recognition of a plurality of the codes, those combinations of position detection patterns that cause false detection can be excluded.

Particularly, when a plurality of the codes, which are arranged adjacent to each other and photographed in a single image, are analyzed, the distances between the position detection patterns in the same two-dimensional code are fixed and, because of the presence of a peripheral section, the distances between those position detection patterns that belong to different two-dimensional codes are longer. Accordingly, those combinations of position detection patterns having different distances therebetween can be easily excluded, so that the number of combinations to be assessed in the process of determining a correct combination can be reduced. Although this effect is greater when the two-dimensional code is in a square form, the effect of reducing the combinations can be obtained even when the two-dimensional code is rectangular.

In the above, embodiments of the present invention were described; however, the above descriptions of the embodiments are provided simply for the purpose of explaining the present invention, and it will be easily understood by those of ordinary skill in the art that various modifications can be made within the scope of claims.

DESCRIPTION OF SYMBOLS

1 Two-dimensional code
2 Basic pattern section
3A First position detection pattern
3B Second position detection pattern
3C Third position detection pattern
4 Data region
5 Peripheral section
10 Two-dimensional code
11 Basic pattern section
12A First position detection pattern
12B Third position detection pattern
12C Fourth position detection pattern
12D Second position detection pattern
13 Region
15 Block
16 Separation pattern
17 Cell
18 Position correction pattern

What is claimed is:

1. A rectangular two-dimensional code comprising cells representing binary-coded data that are arranged as a pattern in the form of a two-dimensional matrix, wherein the two-dimensional code comprises a rectangular basic pattern section which comprises:

plural position detection patterns for specifying the cell positions; and version information that indicates the size of the two-dimensional code, and the version information is used to enable to design the two-dimensional code having different size keeping the same distances between the plural position detection patterns.

2. The rectangular two-dimensional code according to claim 1, wherein the plural position detection patterns have different external shapes from one another.

3. The rectangular two-dimensional code according to claim 2, comprising a peripheral section formed outside the basic pattern section.

4. The rectangular two-dimensional code according to claim 3, wherein the peripheral section comprises the cells.

5. The rectangular two-dimensional code according to claim 3, wherein, for a combination of two of the plural position detection patterns, the distance between two points at which a straight line connecting the centers of the two position detection patterns intersects the boundary between the rectangular two-dimensional code and the outside is greater than twice the distance between the centers of the two position detection patterns.

6. The rectangular two-dimensional code according to claim 2, wherein the version information is used to enable to design the two-dimensional code to decide the size of a peripheral section formed outside the basic pattern section, wherein the peripheral section comprises the cells.

7. The rectangular two-dimensional code according to claim 6, wherein the basic pattern section is capable of recording certain amount of information and the peripheral section is capable of recording the excess amount of information which the basic pattern section is not capable of recording.

8. The rectangular two-dimensional code according to claim 1, comprising a peripheral section formed outside the basic pattern section.

9. The rectangular two-dimensional code according to claim 8, wherein, for a combination of two of the plural position detection patterns, the distance between two points at which a straight line connecting the centers of the two position detection patterns intersects the boundary between the rectangular two-dimensional code and the outside is greater than twice the distance between the centers of the two position detection patterns.

10. The rectangular two-dimensional code according to claim 9, wherein the version information is used to enable to design the two-dimensional code to decide the size of a peripheral section formed outside the basic pattern section, wherein the peripheral section comprises the cells.

11. The rectangular two-dimensional code according to claim 10, wherein the basic pattern section is capable of recording certain amount of information and the peripheral section is capable of recording the excess amount of information which the basic pattern section is not capable of recording.

12. The rectangular two-dimensional code according to claim 8, wherein the peripheral section comprises the cells.

13. The rectangular two-dimensional code according to claim 1, wherein the version information is used to enable to design the two-dimensional code to decide the size of a peripheral section formed outside the basic pattern section, wherein the peripheral section comprises the cells.

14. The rectangular two-dimensional code according to claim 13, wherein the basic pattern section is capable of recording certain amount of information and the peripheral section is capable of recording the excess amount of information which the basic pattern section is not capable of recording.

15. A two-dimensional code analysis system analyzing an image obtained by photographing first and second two-dimensional codes at once, which first and second two-dimensional codes each comprises plural position detection patterns for specifying the cell positions,
   wherein the two-dimensional code analysis system comprises an exclusion means for excluding false combinations of a position detection pattern contained in the first two-dimensional code and a position detection pattern contained in the second two-dimensional code.

16. The two-dimensional code analysis system according to claim 15, wherein, when two of the position detection patterns do not have a prescribed distance therebetween, the exclusion means excludes the combination of these two position detection patterns as a false combination of position detection patterns that is not a combination of position detection patterns contained in a single two-dimensional code.

17. The two-dimensional code analysis system according to claim 15, wherein the exclusion means is a means for excluding a combination(s) of the position detection patterns based on the external shapes of the position detection patterns.

18. The two-dimensional code analysis system according to claim 16, wherein the exclusion means is a means for excluding a combination(s) of the position detection patterns based on the external shapes of the position detection patterns.

* * * * *